United States Patent
Ueno et al.

(10) Patent No.: US 7,082,099 B2
(45) Date of Patent: Jul. 25, 2006

(54) SYSTEM FOR MANAGING LAYERED NETWORK

(75) Inventors: Hitoshi Ueno, Kawasaki (JP); Kohei Iseda, Kawasaki (JP); Kenichi Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 10/061,058

(22) Filed: Jan. 29, 2002

(65) Prior Publication Data

US 2002/0178397 A1   Nov. 28, 2002

(30) Foreign Application Priority Data

May 23, 2001   (JP) ............................. 2001-154389

(51) Int. Cl.
*H04L 1/00*   (2006.01)
(52) U.S. Cl. ...................................... 370/216; 370/242
(58) Field of Classification Search .................... None
See application file for complete search history.

(56) References Cited

U.S. PATENT DOCUMENTS

| | | | | |
|---|---|---|---|---|
| 6,097,731 | A * | 8/2000 | Aoki ......................... | 370/465 |
| 6,898,630 | B1 * | 5/2005 | Ueno et al. ................. | 709/223 |
| 2002/0116669 | A1* | 8/2002 | Jain ........................... | 714/43 |
| 2003/0163555 | A1* | 8/2003 | Battou et al. ............... | 709/223 |

FOREIGN PATENT DOCUMENTS

JP   03096028   4/1991

\* cited by examiner

*Primary Examiner*—Duc Ho
(74) *Attorney, Agent, or Firm*—Katten Muchin Rosenman LLP

(57) ABSTRACT

A system manages a layered network including an upper layer and a lower layer. In this system, a fault or degraded performance on a lower layer line, which is a connection line in a lower layer, is detected as an event. An upper layer line, which is a connection line in an upper layer affected by the detected event, is extracted. Then, a control is conducted for the extracted upper layer line.

11 Claims, 28 Drawing Sheets

FIG. 4

LINK/CONNECTION CORRESPONDENCE TABLE 14

| NO. | LINK ID | CONNECTION ID |
|---|---|---|
| 1 | L4-5/1 | C1-2/1 |
| 2 | L1-3/1 | C1-3/1 |
| 3 | L1-2/1 | C1-2/2 |

ASSOCIATIVE POLICY TABLE 16

| NO. | CONNECTION ID | LINK MONITOR ITEM | THRESHOLD VALUE | CONNECTION MONITOR ITEM | THRESHOLD VALUE | MANAGEMENT ACTION |
|---|---|---|---|---|---|---|
| 1 | C1-2/1 | BANDWIDTH | 5 MPBS OR LESS | AVAILABILITY | 70% OR LOWER | CHANGEFWQ |
| 2 | C1-3/1 | DELAY | 1 SEC OR LONGER | — | — | SENDREPORT |
| 3 | C1-2/2 | INTERRUPTED COMMUNICATION | — | — | — | REROUTING |

FIG. 7

CONNECTION INFORMATION TABLE                    17

| NO. | CONNECTION ID | AVAILABILITY (%) |
|---|---|---|
| 1 | C1-2/1 | 50 |
| 2 | C1-2/2 | 70 |
| 3 | C1-3/1 | 30 |

FIG. 13A

ASSOCIATIVE POLICY TABLE 16A

| NO. | CONNECTION ID | LINK MONITOR ITEM | THRESHOLD VALUE | CONNECTION MONITOR ITEM | THRESHOLD VALUE | MANAGEMENT ACTION | PRIORITY |
|---|---|---|---|---|---|---|---|
| 1 | C1-2/1 | BANDWIDTH | 5 MPBS OR LESS | AVAILABILITY | 70% OR LOWER | CHANGEFWQ | 1 |
| 2 | C1-3/1 | DELAY | 1 SEC OR LONGER | — | — | SENDREPORT | 2 |
| 3 | C1-2/2 | INTERRUPTED COMMUNICATION | | — | — | REROUTING | — |

FIG. 13B

ASSOCIATIVE POLICY TABLE 16A

| NO. | CONNECTION ID | EVENT ID | CONNECTION MONITOR ITEM | THRESHOLD VALUE | MANAGEMENT ACTION | PRIORITY |
|---|---|---|---|---|---|---|
| 1 | C1-2/1 | E1 | AVAILABILITY | 70% OR LOWER | CHANGEFWQ | 1 |
| 2 | C1-3/1 | E2 | — | — | SENDREPORT | 2 |
| 3 | C1-3/2 | E3 | — | — | REROUTING | — |

FIG. 20

MESSAGE CLASSIFICATION TABLE 25

| EVENT ID | CONNECTION ID | MANAGEMENT ACTION |
|---|---|---|
| E1 | C1-2/1 | — |
| E2 | C1-3/1 | SENDREPORT |
| E3 | C1-2/2 | REROUTING |

FIG. 26

MESSAGE CLASSIFICATION TABLE                    25A

| NO. | EVENT ID | CONNECTION ID | MANAGEMENT ACTION | PRIORITY |
|-----|----------|---------------|-------------------|----------|
| 1   | E1       | C1-2/1        | —                 | 1        |
| 2   | E2       | C1-2/1        | SENDREPORT        | 2        |
| 3   | E3       | C1-3/1        | REROUTING         | —        |

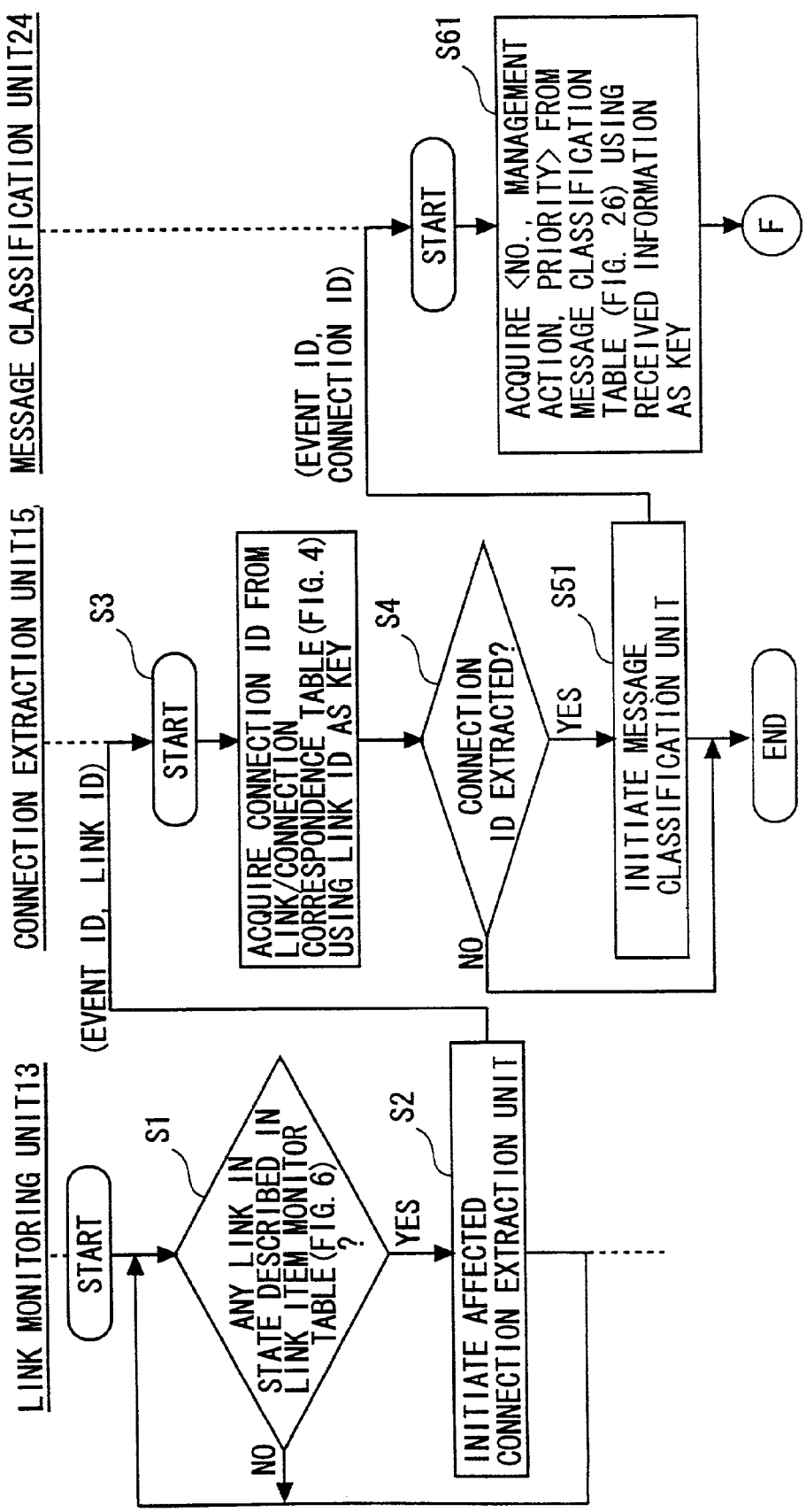

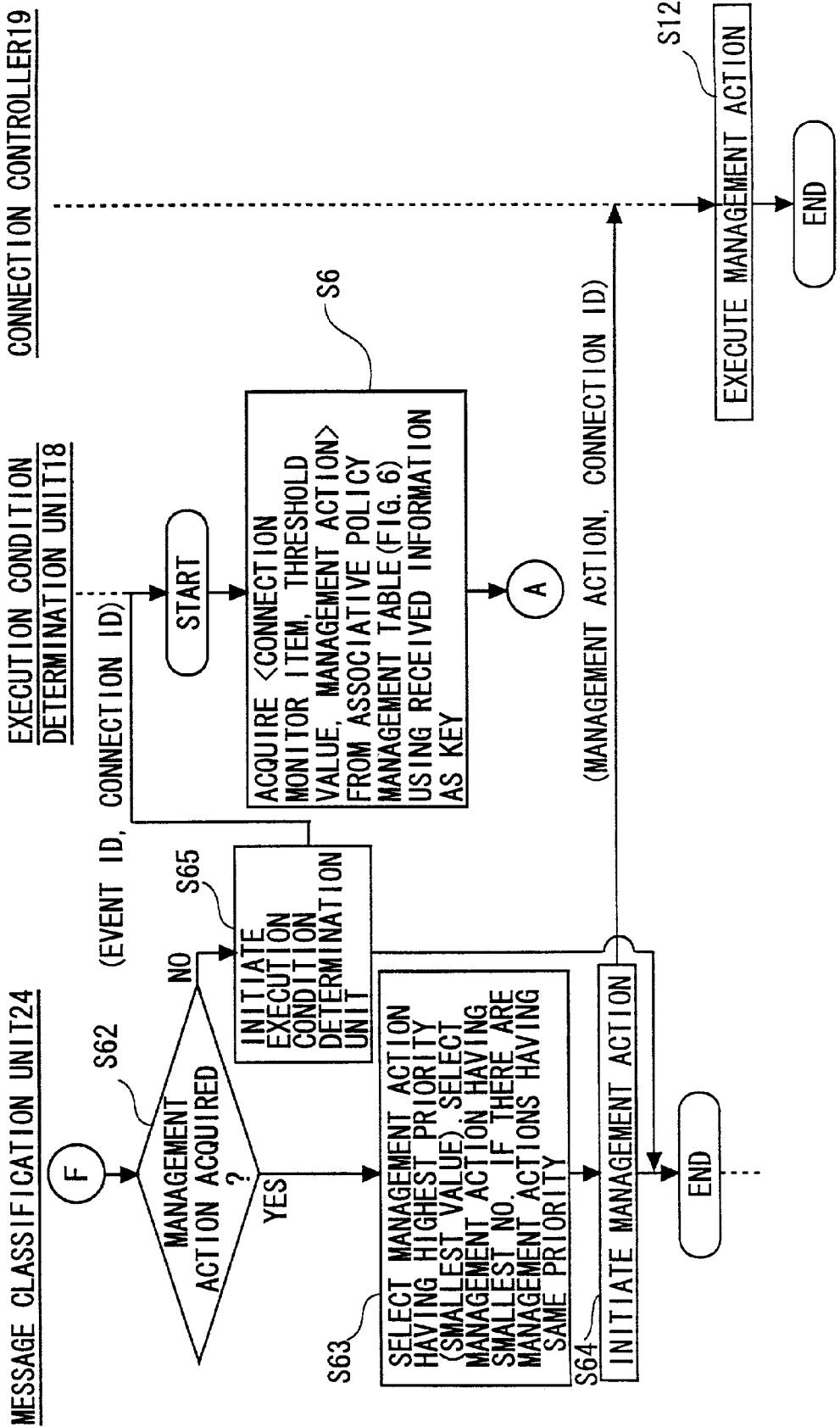

SYSTEM FOR MANAGING LAYERED NETWORK

BACKGROUND OF THE INVENTION

1. Field of the Invention

The present invention relates to a system for managing a layered network which includes an upper layer and a lower layer, and more particularly, to recovery from a fault in a layered network which is configured of different management domains such as the topology, technology (SONET, ATM, IP) and the like.

2. Description of the Related Art

Conventionally, there is a layered network that is configured of different management domains such as the topology, technology (SONET, ATM, IP) and the like. Such a layered network is managed in accordance with individual management policies for respective layers. This is because each layer is implemented by a different technology. Therefore, it is often the case that an upper layer fails to detect a fault that has occurred in a lower layer, and a long time is taken for the upper layer to detect the fault.

In the following, an exemplary fault management will be described for an illustrative upper layer represented by the IP (Internet Protocol) network (layer 3) that has been increasingly utilized in recent years. A router on an IP network periodically exchanges a connection confirmation data packet (HELLO packet) with an adjacent router to confirm that the router is in connection with the adjacent router. In this event, if a fault exists between the routers, the router cannot receive the connection confirmation data packet from the adjacent router.

Generally, the router determines that the connection fails between the router itself and the adjacent router if it does not receive the connection confirmation data packet from the adjacent router within a predetermined time period. In this event, connection rerouting is performed. The rerouting permits the router to transmit data packets, which have been transmitted to the adjacent router, to another router that corresponds to the bypassed one. In this way, the data packets are transmitted to a destination through a bypass route.

In the rerouting, the transfer priority and allocated bandwidth for data packets are set to an alternative router. The settings are performed by an IP layer management system that is triggered by a notice from a router that determines the occurrence of a fault.

The following problem has been encountered in the foregoing system that relies on the connection confirmation data packet to detect a fault and proceeds with recovery processing (the rerouting and the like). Specifically, a fault in a connection of the layer 3 is caused by a failed link (disconnected link) in a lower layer (data link layer: layer 2). This link fault can be detected by the aforementioned system at the layer 3. However, in the layer 3, a transmission interval for the connection confirmation data packet is typically set to several minutes for purposes of limiting the amount of traffic. In addition, a fault may be determined when the connection confirmation data packet cannot be received several times in succession from an adjacent router.

On the other hand, a network on a lower layer (layer 2) is managed and controlled in accordance with a management policy different from that of the layer 3. A link fault is detected in the layer 2 management system. A link fault in the layer 2 is often detected earlier than that in the layer 3 because of the fault detection system in the layer 3 which is configured as described above.

Conventionally, however, the layer 2 and layer 3 are managed by different management systems as mentioned above, so that a link fault detected in the layer 2 is not notified to the layer 3 management system. For this reason, although a link fault has been detected in the layer 2, the layer 3 detects the link fault through a connection fault at a later time.

Also, even when a fault on a link in the layer 2 results in a reduction in the bandwidth, a router can exchange the connection confirmation data packet in the layer 3. Therefore, the router does not recognize the degraded performance (reduced bandwidth) in the layer 2. As such, the layer 3 management system does not take any measures thereto. In this way, the control policy in the layer 3 based on information on the network in the layer 3 fails to accommodate the degraded performance of a link in the layer 2.

The foregoing problems: (1) an excessive time taken to detect a fault on a link (line connection) in a lower layer; and (2) the inability to accommodate the degraded performance of a link (line connection) in the lower layer, have remained as general problems in a layered network in which the upper layer and lower layer are managed and controlled based on different policies independently of each other.

SUMMARY OF THE INVENTION

It is an object of the present invention to provide a management system for use in a layered network that includes an upper layer and a lower layer, which is capable of permitting the upper layer to promptly take measures to a fault on a line connection, or managing the upper layer in accordance with degraded performance.

The present invention employs the following configuration for achieving the above object.

Specifically, the present invention provides a system for managing a layered network comprising:

detecting means for detecting a fault or degraded performance of a lower layer line, which is a connection line in a lower layer, as an event;

extracting means for extracting an upper layer line which is a connection line in an upper layer affected by a detected event; and control means for conducting a control on the extracted upper layer line.

In the present invention, a fault on a lower layer line may be, for example, a disconnected link, and degraded performance on a lower layer line may be a reduced bandwidth, delay, and the like. The control for an upper layer line maybe, for example, rerouting, notice to an administrator, buffer control for a transmitter in the upper layer, and the like.

According to the present invention, when a fault or degraded performance is detected on a lower layer line, an upper layer line affected thereby is identified to conduct a control for the upper layer line. By conducting the control for the upper layer line based on the detected fault on the lower layer line, the fault on the lower layer can be more rapidly detected than before, thereby reducing a time required for recovery processing (for example, rerouting) for the detected fault in the upper layer. In addition, a policy control can be conducted on the upper layer in consideration of the degraded performance on the lower layer line.

Preferably, the system according to the present invention further comprises control activity storing means for storing control activities for an upper layer line and execution conditions for the control activities in association with contents of an event and the upper layer line; and determining means operative when an event is detected and an upper layer line is extracted for referencing the control activity storing means to determine whether or not an execution condition for a control activity corresponding to the contents of the detected event and the extracted layer line is satisfied, and for instructing the control means to execute the control activity when the determining means determines the execution condition is satisfied.

With the foregoing configuration, the policy control, which is conducted in association of the lower layer and upper layer, can be defined on the upper layer side for a fault or degraded performance which has occurred in the lower layer.

Also, preferably, in the present invention, the control activities include rerouting of an upper layer line, and the control system further comprises calculating means operative when an upper layer line is detected for calculating a bypass route for the extracted upper layer line, wherein the control means is configured to perform the rerouting using a bypass route previously calculated by the calculating means when the determining means determines that a execution condition for the rerouting is satisfied for the extracted upper layer line.

With the foregoing configuration, when the control means performs the rerouting as the policy control for the upper layer, a time required for the rerouting can be reduced because a bypass route has been previously calculated.

Further, preferably, the control system according to the present invention further comprises second determining means operative when an event is detected and an upper layer line is detected for determining whether or not a determination processing is necessary for said upper layer line by the determining means, and for instructing the control means to execute a control activity corresponding to the contents of the event stored in the control content storing means and the upper layer line without passing through the determination processing made by the determining means when determining that the determination processing is not necessary, and for instructing the determining means to execute the determination processing when determining that the determination processing is necessary.

The control activities that require the determination may include, for example, a control activity (management policy) that requires a threshold-based determination on the upper layer line for determining whether or not its execution condition is satisfied. The control activities that do not require the determination may include a control activity that does not require the threshold-based determination, for example, a control activity for which the occurrence of an associated event itself is an execution condition. Since this control scheme can omit the determination made by the determining means, the control activity can be implemented at an earlier time.

BRIEF DESCRIPTION OF THE DRAWINGS

FIG. 4 is a diagram for explaining a link/connection correspondence table;

FIG. 5 is a diagram for explaining an associative policy table;

FIG. 7 is a diagram for explaining a connection information table;

FIGS. 13A and 13B are diagrams for explaining an associative policy table according to a second embodiment;

FIG. 20 is a diagram for explaining a message classification table shown in FIG. 19;

FIG. 26 is a diagram for explaining a message classification table according to a fifth embodiment; and FIG. 27 is flow charts illustrating a routine processed by a management system according to the fifth embodiment.

FIGS. 28 is flow charts illustrating a routine processed by a management system according to the fifth embodiment.

DESCRIPTION OF THE PREFERRED EMBODIMENT

In the following, embodiments of the present invention will be described with reference to the accompanying drawings. It should be understood that the configurations shown in the embodiments are merely illustrative and the present invention is not limited to the scope of the configurations shown in the embodiments.

First Embodiment

Figure 1:
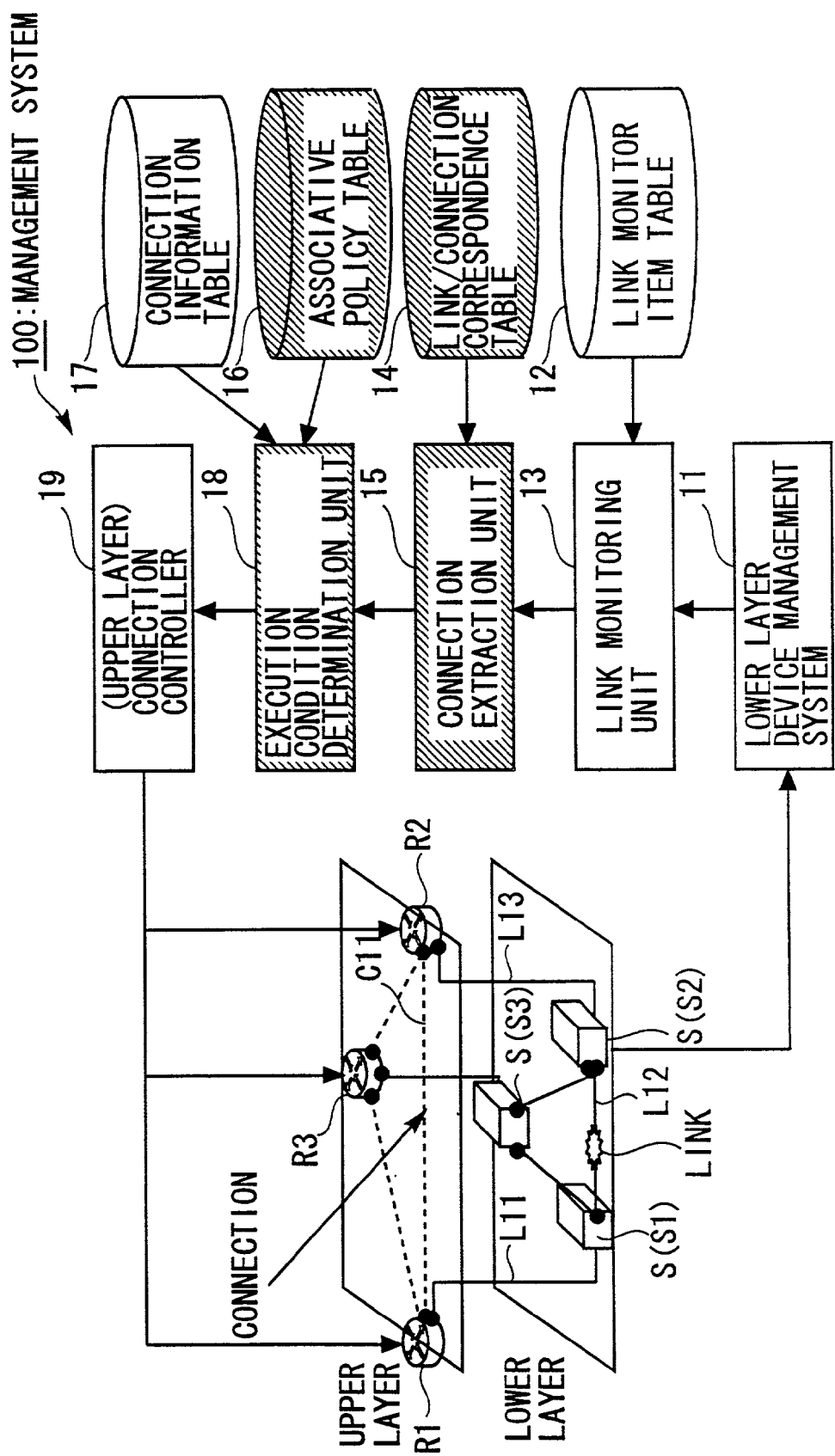
FIG. 1 is a diagram illustrating an exemplary configuration of a system for managing a layered network according to a first embodiment.
Figure 2:
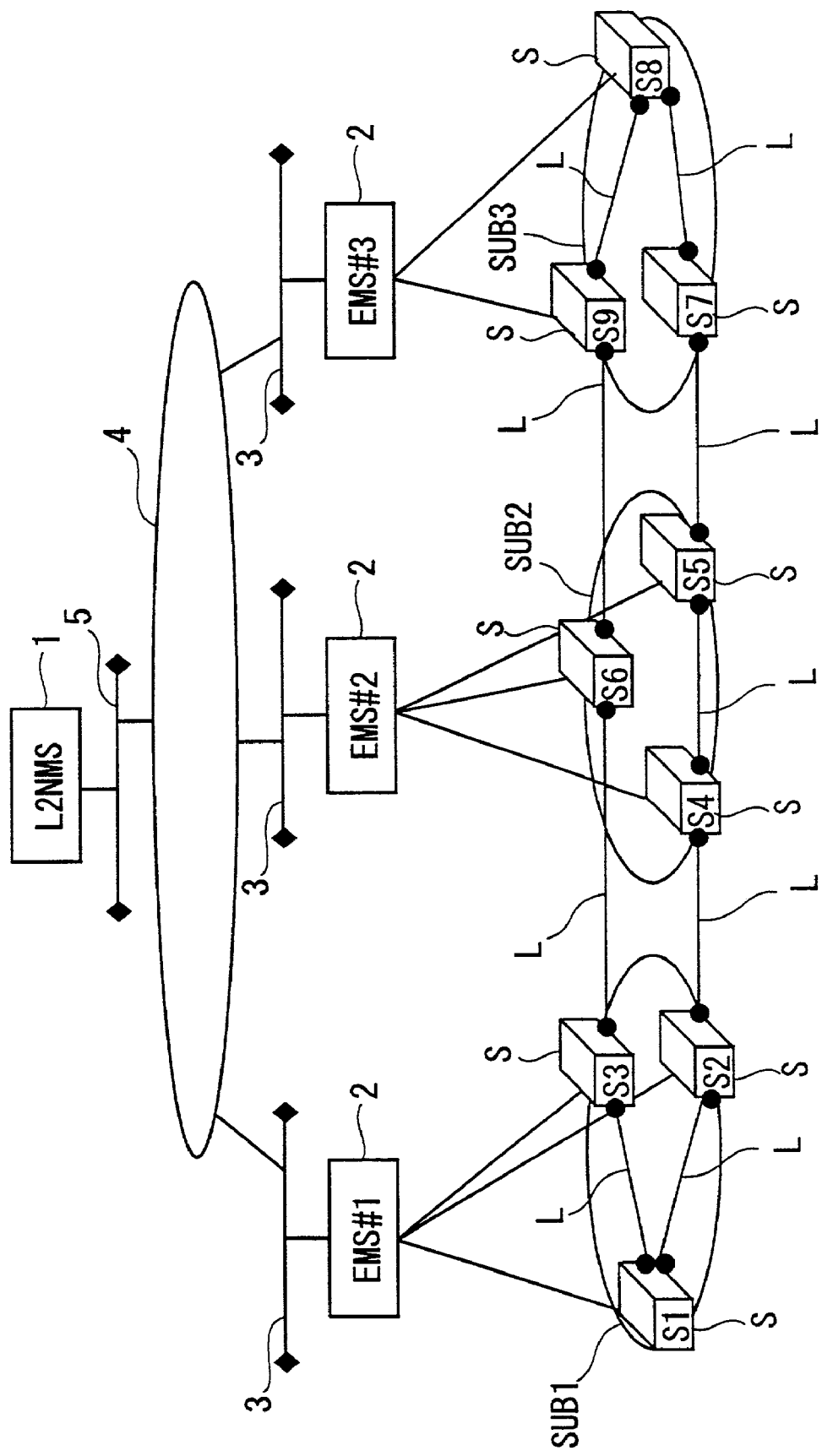
FIG. 2 is a diagram for generally explaining a system for managing a network in a lower layer.
Figure 3:
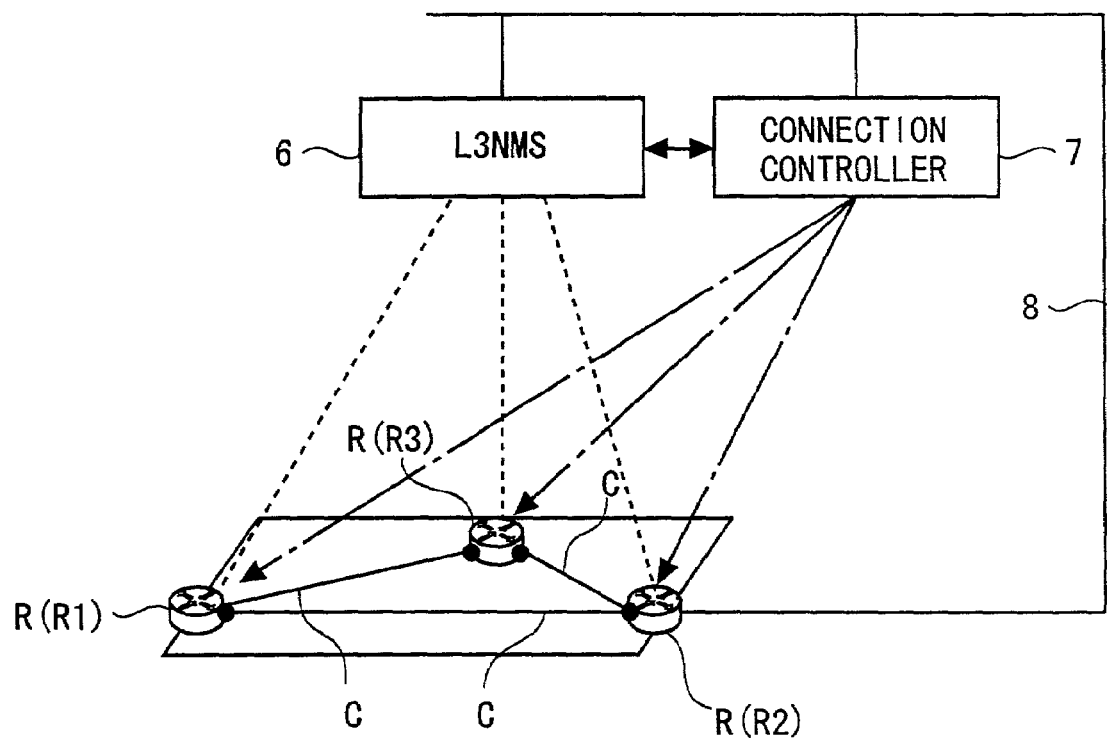
FIG. 3 is a diagram for generally explaining a system for managing a network in an upper layer.

FIG. 1 is a diagram illustrating an exemplary configuration of a network management system 100 according to a first embodiment of the present invention. FIG. 2 is a diagram illustrating an exemplary configuration of a network LN in a lower layer, and a management system therefor. FIG. 3 is a diagram illustrating an exemplary configuration of a network UN in an upper layer, and a management system therefor.

The management system according to the present invention is applied to a layered network having a plurality of layers. In the first embodiment, as illustrated in FIG. 1, the management system 100 manages a layered network which is comprised of a network in an upper layer and a network in a lower layer. A network layer (layer 3) is assumed as the upper layer, while a data link layer (layer 2) is assumed as the lower layer.

As illustrated in FIG. 2, the lower layer is comprised of a plurality of transmitters S (in FIG. 2, transmitters S1–S9 are illustrated) interconnected through links L (lower layer lines), wherein electric signals corresponding to data packets of users (customers) are transmitted through the transmitters S and links L. The transmitters S may be, for example, switches.

The lower layer, when it is large in scale, is divided into a plurality of sub-networks (management domains), and managed on a management domain basis. This results in a reduction in the processing cost associated with the management. In the example of FIG. 2, the network in the lower layer is divided into three sub-networks SUB1, SUB2, SUB3. In this event, a management/control unit, referred to as a "layer 2 network management system (L2NMS)" 1, is provided for managing and controlling topology information (information on the transmitters S and links L (topology, status, and the like) of the lower layer, as a management system for the lower layer, and a management/control unit, referred to as an "element management system (EMS: Equipments Management System)" 2, is provided for each sub-network.

Each EMS2 is connected to the transmitters S associated therewith within a management domain through a monitor link. On the other hand, each EMS2 is connected to the L2NMS1 through a local network 3 to which the EMS2 itself belongs; a system control/management data network 4; and a local network 5 to which the L2NMS1 belongs.

Each of the transmitters S is equipped with a performance monitoring system (Lower Layer Device Management System 11) for monitoring the status of an associated link L (bandwidth, delay, link disconnection, and the like). The performance monitoring system (Lower Layer Device Management System) monitors the presence or absence of received signals, signal level, signal receiving timing, and the like to detect the status of the link L (fault in the link (disconnected link), degraded performance (reduced bandwidth, delayed transmission), and notifies the EMS2 of the detected status as performance data. The status of the link L is detected at intervals sufficiently shorter than intervals at which connection confirmation data packets are sent in the upper layer, so that a fault and degraded performance on the link L can be detected earlier than the upper layer.

The EMS2 conducts a policy control of the lower layer for the management domain based on the performance data to manage and control the management domain. For example, the EMS2 performs recovery processing for a fault, if any on the link L. The EMS2 acquires information on the transmitters S and links L which belong to the associated management domain from the L2NMS1 as required for managing and controlling the management domain.

The upper layer is comprised of a plurality of transmitters R (in FIG. 3, transmitters R1–R3 are illustrated) which are interconnected through connections C (IP flow: upper layer lines), wherein data packets of users (customers) are transmitted through the connections C. The transmitters R may be, for example, routers.

The upper layer is provided with a layer 3 network management system (L3NMS) 6, and a connection controller 7. The L3NMS6 and connection controller 7 are connected to the connection controller 7 of the transmitters R, so that the L3NMS6 is connected to the respective transmitters R1–R3 through the connection controller 7.

Each of the transmitters R1–R3 performs mutual monitoring based on a connection confirmation data packet using, for example, a routing protocol such as OSPF, and determines a link fault between itself and an adjacent transmitter R when no response is returned from the adjacent transmitter R. Then, triggered by this determination, the transmitter performs recovery processing (for example, rerouting) for the fault. For the rerouting, the connection controller 7 conducts a connection control (setting a data packet transfer priority, bandwidth allocation, and the like) for a transmitter R to which data packets are alternatively transmitted. The connection controller 7 acquires information on the upper layer (topology information, resource information, and information on the transmitters R and connections C) from the L3NMS6 as required.

Each of the connections in the upper layer is in a corresponding relationship to one of the links in the lower layer. For example, as illustrated in FIG. 1, when the layered network is comprised of the upper layer having the topology illustrated in FIG. 3 and the lower layer having the topology of the sub-network SUB1 illustrated in FIG. 2, a connection C11 which interconnects the transmitter R1 and transmitter R2 corresponds to links L11, L12, and L13 in the lower link.

As illustrated in FIG. 1, the management system 100 comprises a lower layer device management system 11; a link monitor item table 12; a link monitoring unit 13 (detecting means); a link/connection correspondence table 14; a connection extraction unit 15 (extracting unit); an associative policy table 16 (control contents storing means); a connection information table 17; an execution condition determination unit 18 (determining means); and a connection controller 19 (control means).

FIG. 4 is an explanatory diagram showing an example of the link/connection correspondence table 14. The link/connection correspondence table 14, which is a table for holding the correspondence relationship between links and connections, holds a record which includes link identification information (link ID) and connection identification information (connection ID) corresponding thereto for each link. Generally, the link ID is managed by the L2NMS1, while the connection ID is managed by the L3NMS6. The link/connection correspondence table 14 is generated by reading necessary link IDs and connection IDs from them.

In this example, the link is represented in the following notation which is used as the link ID. Specifically, a link L is identified by two transmitters S coupled by the link, and an order (number) assigned to this link. For example, an n-th link which interconnects a transmitter Sn (n is identification information of a transmitter S) and a transmitter Sm (m is identification information of a transmitter S) is represented by "Ln-m/n." More specifically, for example, in FIG. 1, the first link L which interconnects the transmitter S1 and transmitter S2 is denoted as "L1-2/1" which is used as the link ID of this link. The connection C is represented in a similar notation as the link L, and this notation is used as the connection ID. Specifically, an n-th connection which interconnects a transmitter Rn (n is identification information of a transmitter R) and a transmitter Rm (m is identification information of transmitter R) is represented by "Cn-m/n." More specifically, for example, in FIG. 1, a connection C which interconnects a transmitter R1 and transmitter R2 is denoted as "C1-2/1," and this notation is used as the connection ID of this connection. It should be noted that the link "Ln-m/a" and link "Lm-n/a" are the same link (the same is true for the connections)

FIG. 5 is an explanatory diagram showing an example of an associative policy table 16. The associative policy table 16 is a table for storing information defined by an administrator of the management system 100 as a management policy (associative policy) performed through association of the upper layer management system with the lower layer management system. In this example, a fault or degraded performance of the link L is defined as an event, and a policy control for the upper layer associated to a connection for this event is defined as an associative policy.

For this reason, the associative policy table 16 holds, for each of connection IDs and event IDs, a management policy which is comprised of a link monitor item previously assigned to a connection and a threshold value therefor (event ID: contents of the event); a connection monitor item and a threshold value therefor (execution conditions); and a management action (control activity) (see FIG. 7).

Specifically, the associative policy table 16 holds one or a plurality of records, each of which includes, as elements, a connection ID defined by the administrator of the management system 100; a link monitor item; a threshold value for the link monitor item; a connection monitor item; a threshold value for the connection monitor item; and management action information. Each record is assigned a management number.

The link monitor item indicates items associated to the status of a link which is subjected to the policy control in the upper layer. The link status items includes an item indicative of a fault on a link L such as "interrupted communication (disconnected link)" and the like, and an item indicative of degraded performance of the link L such as "bandwidth," "(transmission) delay" and the like. The item indicative of the performance can have a threshold value which is used to determine whether or not the performance is degraded.

The management action information shows the contents of the policy control conducted in the upper layer. In this example, the management action includes "ChangeFWQ" for controlling the capacity or the like of a buffer (forwarding queue) for data packets provided in a transmitter R, "sendReport" for notifying the administrator of a fault or degraded performance, and "reRouting" for performing the rerouting.

An execution condition is set for each management action. The execution conditions include one which is the occurrence of an event (detection) itself, and one which is satisfied when data corresponding to an associated monitor item becomes higher or lower than a predetermined threshold. For the latter case, a connection availability is defined as a monitor item, and its execution condition is satisfied when the availability managed by the L3NMS6 becomes higher or lower than a predetermined threshold. In the example shown in FIG. 5, a monitor item "availability" and a threshold value "70% or lower" for a connection are defined as the execution condition for the management action "changeFWQ" corresponding to the event (the bandwidth is reduced to 5 Mbps or less).

Figure 6:
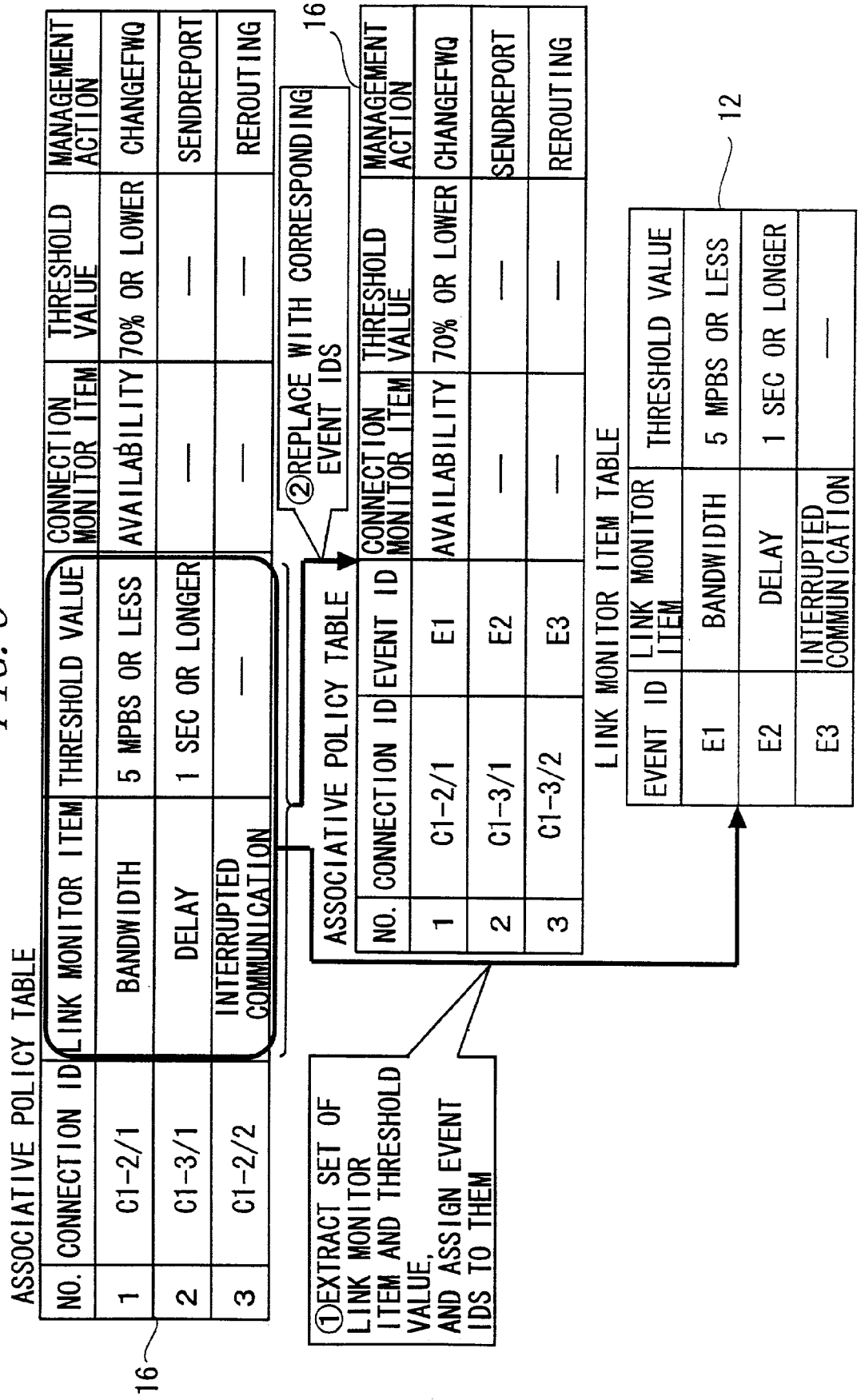
FIG. 6 shows a link monitor item table and a diagram for explaining a method of generating the table.

When the management system 100 is operated, a link monitor item table 12 is generated in accordance with the contents of the associative policy table 16 which is defined by the administrator. Specifically, as shown in FIG. 6, a set of a link monitor item and a threshold value therefor, stored in the associative policy table 16 is extracted, and assigned an event ID. Then, a record including the event ID, link monitor item, and threshold value (which may be omitted in some cases) is created for each of link monitor items defined in the associative policy table 16. Then, the link monitor item table 12 is created for holding the created single or plurality of records. On the other hand, the link monitor items and threshold values therefor stored in the associative policy table 16 are re-written to corresponding event IDs. In this way, the events defined in the associative policy table 16 are detected in the lower layer.

FIG. 7 is an explanatory diagram showing an example of a connection information table 17. The connection information table 17 holds current values corresponding to the connection monitor items defined in the associative policy table 16 for at least connections defined in the associative policy table 16. In this example, the connection information table 17 holds records, each of which includes a connection ID, and a connection monitor item corresponding thereto.

Figure 8:
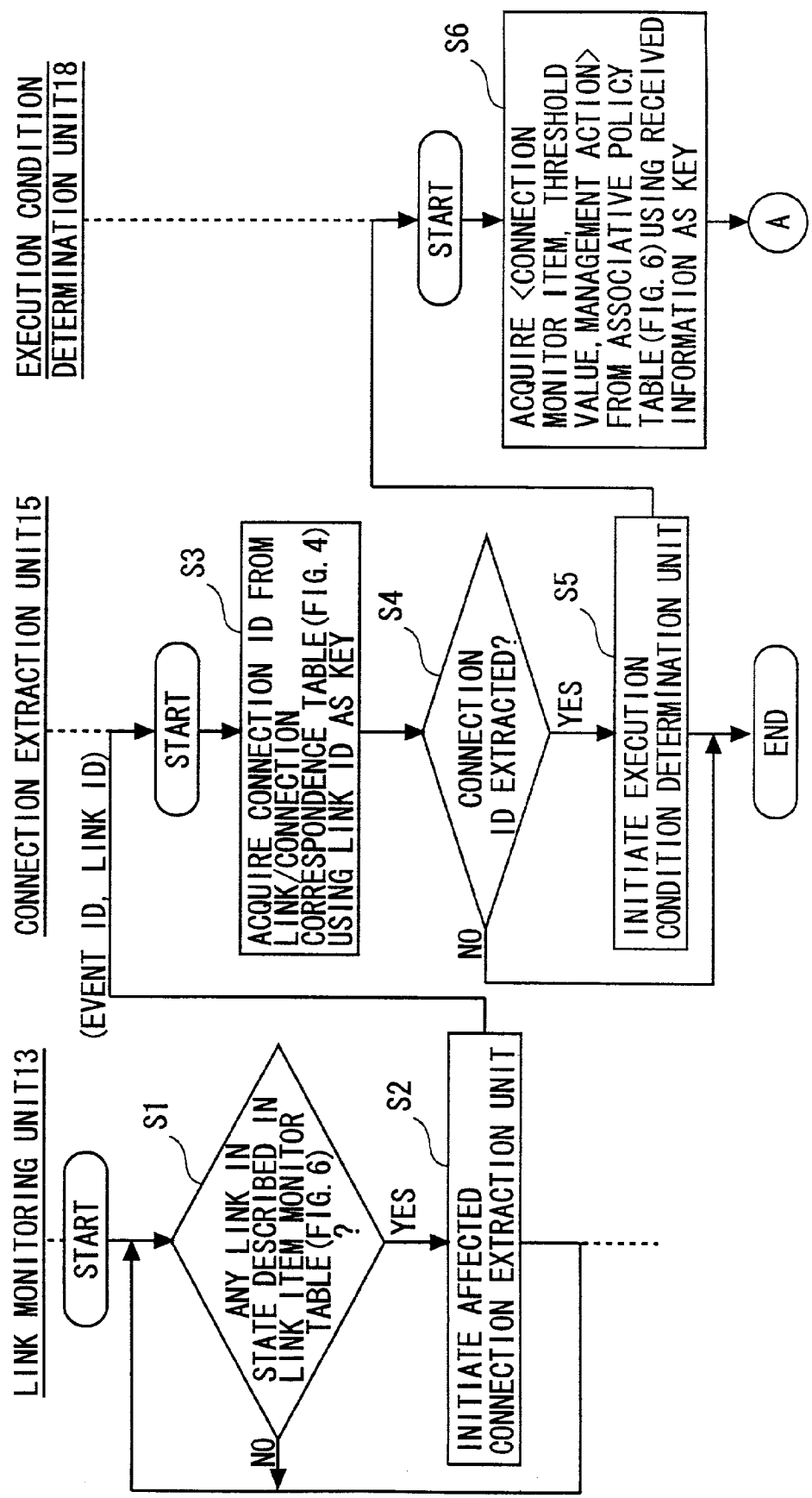
FIG. 8 is flow charts illustrating a routine processed by the management system according to the first embodiment.
Figure 9:
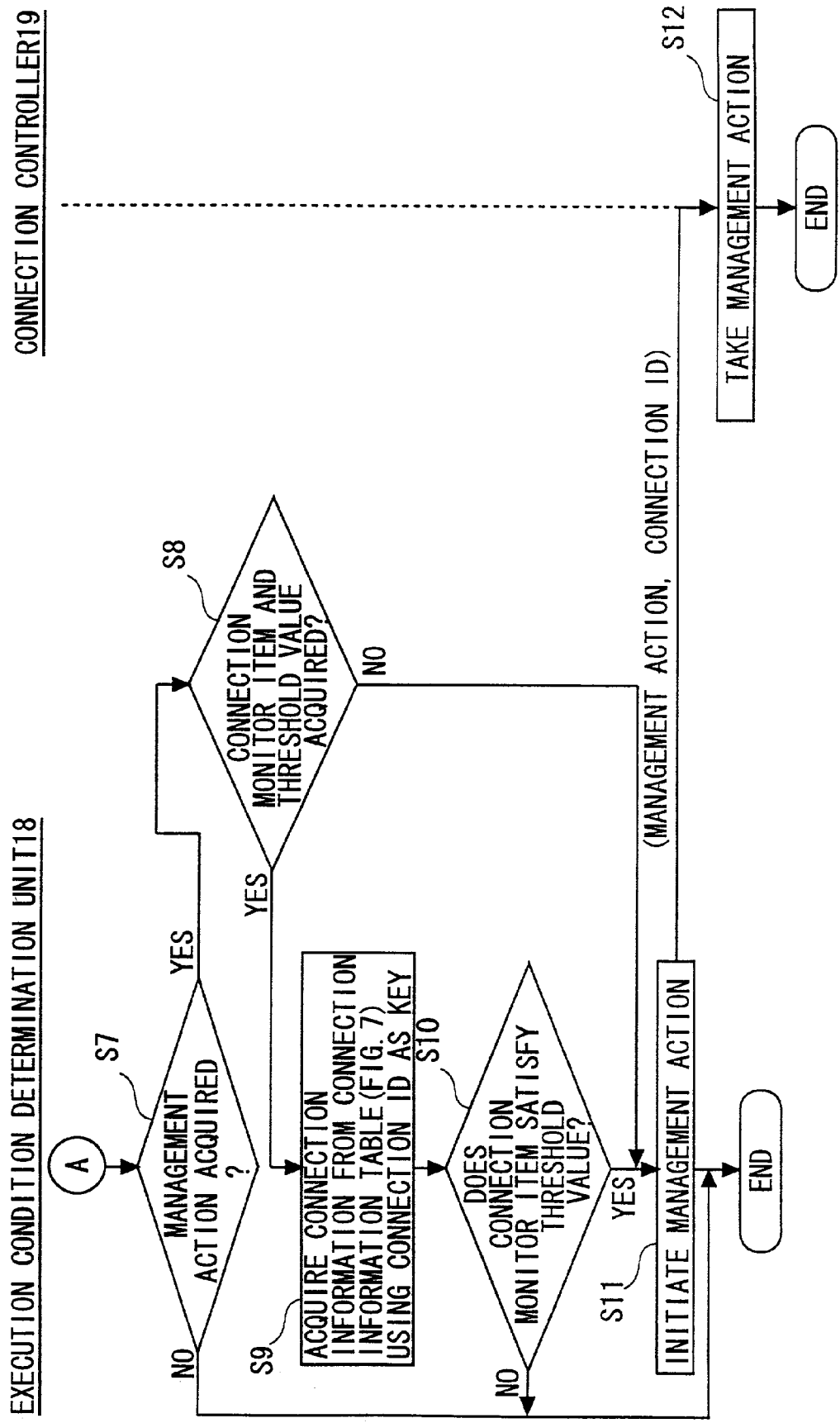
FIG. 9 is flow charts illustrating a routine processed by the management system according to the first embodiment.

FIGS. 8 and 9 are flow charts illustrating a routine processed by the management system 100 illustrated in FIG. 1. As the promise of the routine illustrated in FIGS. 8 and 9, the link monitor item table 12 has been generated using the associative policy table 16, and the contents of the associative policy table 16 has been re-written. The lower layer device management system 11 monitors the status of the links L, and notifies the link monitoring unit 13 of the status of each link L (performance data) together with its link ID.

The link monitoring unit 13 references the status of links L notified from the lower layer device management system 11, and determines whether or not any link falls under the status (link monitor items) described in the link monitor item table 12 (FIG. 6) (step S1).

Specifically, the link monitoring unit 13 determines whether or not the status of any link L satisfies at least one of the conditions described in the link monitor table 12. More specifically, the link monitoring unit 13 determines whether or not the bandwidth of the link L is 5 Mpbs or less; whether or not a delay time is one second or longer; and whether or not the link L is in an interrupted communication (disconnected link) state. In this event, when none of the conditions is satisfied (NO at step S1) the link monitoring unit 13 returns the processing to step S1, and waits for the next notice.

On the other hand, when the status of the link L satisfies at least one condition (YES at step S1), the link monitoring unit 13, which assumes that an event defined as an associative policy has occurred, reads an event ID corresponding to the satisfied condition (link monitor item) from the link monitor item table 12, and notifies the connection extraction unit 15 of the read event ID together with the corresponding link ID. In this way, the link monitoring unit 13 initiates the connection extraction unit 15 (step S2).

The connection extraction unit 15 is initiated in response to a notice including the event ID and link ID received from the link monitoring unit 13. The connection extraction unit 15 references the link/connection correspondence table 14 (FIG. 4) to search for a connection ID corresponding to the notified link ID (step S3), and determines whether or not the corresponding connection ID can be extracted (step S4).

In this event, the connection extraction unit 15 terminates the processing when the corresponding connection ID cannot be extracted (NO at step S4), and initiates the execution condition determination unit 18 by notifying the same of the even ID and connection ID (step S5) when the corresponding connection ID can be extracted (YES at step S4).

In this way, upon receipt of a monitor event (event ID and link ID) from the link monitoring unit 13, the connection extraction unit 15 searches the link/connection correspondence table, using the link ID as a key, to extract a connection (connection ID) which is affected, and then notifies the execution condition determination unit 18 of monitor event data (event ID) and extracted connection data (connection ID).

The execution condition determination unit 18 is initiated in response to a notice including the event ID and connection ID received from the connection extraction unit 15. The execution condition determination unit 18 searches the associative policy table 16 (FIG. 6), using the notified event ID and connection ID as keys, for a connection monitor item, a threshold value therefor, and management action information in a record corresponding to the keys (step S6), and determines whether or not the management action information corresponding to the keys can be acquired (step S7).

In this event, the execution condition determination unit 18 terminates the processing when corresponding management action information cannot be acquired (NO at step S7), and determines whether or not a connection monitor item and a threshold value thereto corresponding to the keys can be acquired when the corresponding management information can be acquired (step S8). In this event, the execution condition determination unit 18 advances the processing to step S9 when the corresponding connection monitor item and threshold value therefor can be acquired, and otherwise advances the processing to step S9 (NO at step S8) on the assumption that the management action is taken under the condition that the event itself is detected.

At step S9, the execution condition determination unit 18 uses the notified connection ID as a key to read connection information (availability of the connection C) corresponding to the key from the connection information table 17 (FIG. 7).

Subsequently, the execution condition determination unit 18 determines whether or not the availability read from the connection information table 17 satisfies the threshold value read from the associative policy table 16 (whether or not it satisfies the execution condition for the management action) (step S10). In this event, the execution condition determination unit 18 terminates the processing when the availability does not satisfy the threshold (NO at step S10), and advances the processing to step S11 when the availability satisfies the threshold (YES at step S10).

At step S11, the execution condition determination unit 18 notifies the connection controller 19 of the management action information and connection ID to initiate the connection controller 19.

In this way, the execution condition determination unit 18 searches the associative policy table 16 using the data from the connection extraction unit 15 as a key to extract a connection monitor item, threshold value therefor, and management action. Then, the execution condition determination unit 18 utilizes the connection information table 17 to confirm whether the relationship between the connection monitor item and the threshold is established, and initiates the connection controller 19 which takes the management action when established.

Upon receipt of the management action control and connection ID, the connection controller 19 takes the management action, defined as the management policy, to the connection C corresponding to the received connection ID (step S12). The associative policy is conducted in this way, wherein a fault or degraded performance on a link L in the lower layer is defined as an event, and the connection affected by this event is controlled.

Figure 10:
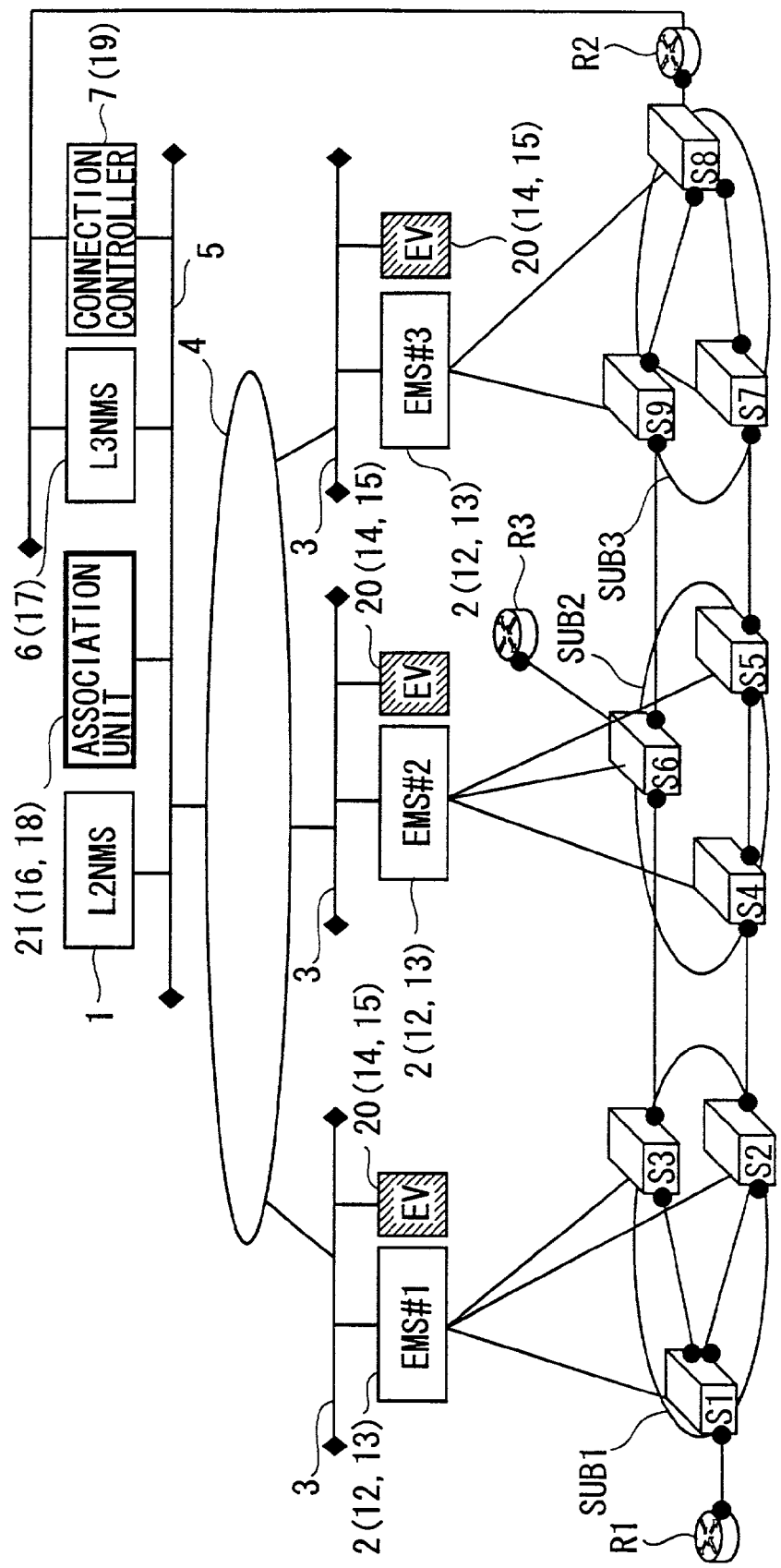
FIG. 10 is a functional layout diagram for the management system illustrated in FIG. 1.

FIG. 10 is a diagram illustrating an exemplary configuration of respective components in the management system 100 illustrated in FIG. 1, when they are arranged in the layered network LTN illustrated in FIGS. 2 and 3. As illustrated in FIG. 10, the L2NMS1 illustrated in FIG. 2, the L3NMS4 illustrated in FIG. 3, and connection controller 5 are interconnected through a local network 5. In addition, as a new component, an event reception/connection extraction unit 20 is contained in each local network 3 which contains the EMS2, and an association unit 21 is contained in the local network 5.

The lower layer device management system 11 illustrated in FIG. 1 corresponds to a performance monitoring system which has been conventionally installed in the transmitter S. The link monitor item table 12 and link monitoring unit 13 are installed in the EMS2. The performance monitoring system of each transmitter S monitors the status of a link L contained therein, notifies the EMS2 of performance data indicative of the status of the link L, and determines whether or not an event, defined as an associative policy by the EMS2, has occurred (detection of the event).

The link/connection correspondence table 14 and connection extraction unit 15 are installed in the event reception/connection extraction unit 20. The associative policy table 16 and execution condition determination unit 18 are installed in the association unit 21. The association unit 21 generates the aforementioned link monitor item table 12, re-writes the association policy table 16, and distributes the contents of the link monitor item table 12 to the respective EMS2. The connection information table 17 is installed in the L3EMS6, and the connection controller 19 corresponds to the connection controller 7.

The link/connection correspondence table 14 and connection extraction unit 15 may be installed in the association unit 21. In this event, the event reception/connection extraction unit 20 is omitted, and the EMS2 notifies the association unit 21 of a connection ID and an event ID. Such a modification can be applied as well to a second embodiment, later described.

Figure 11:
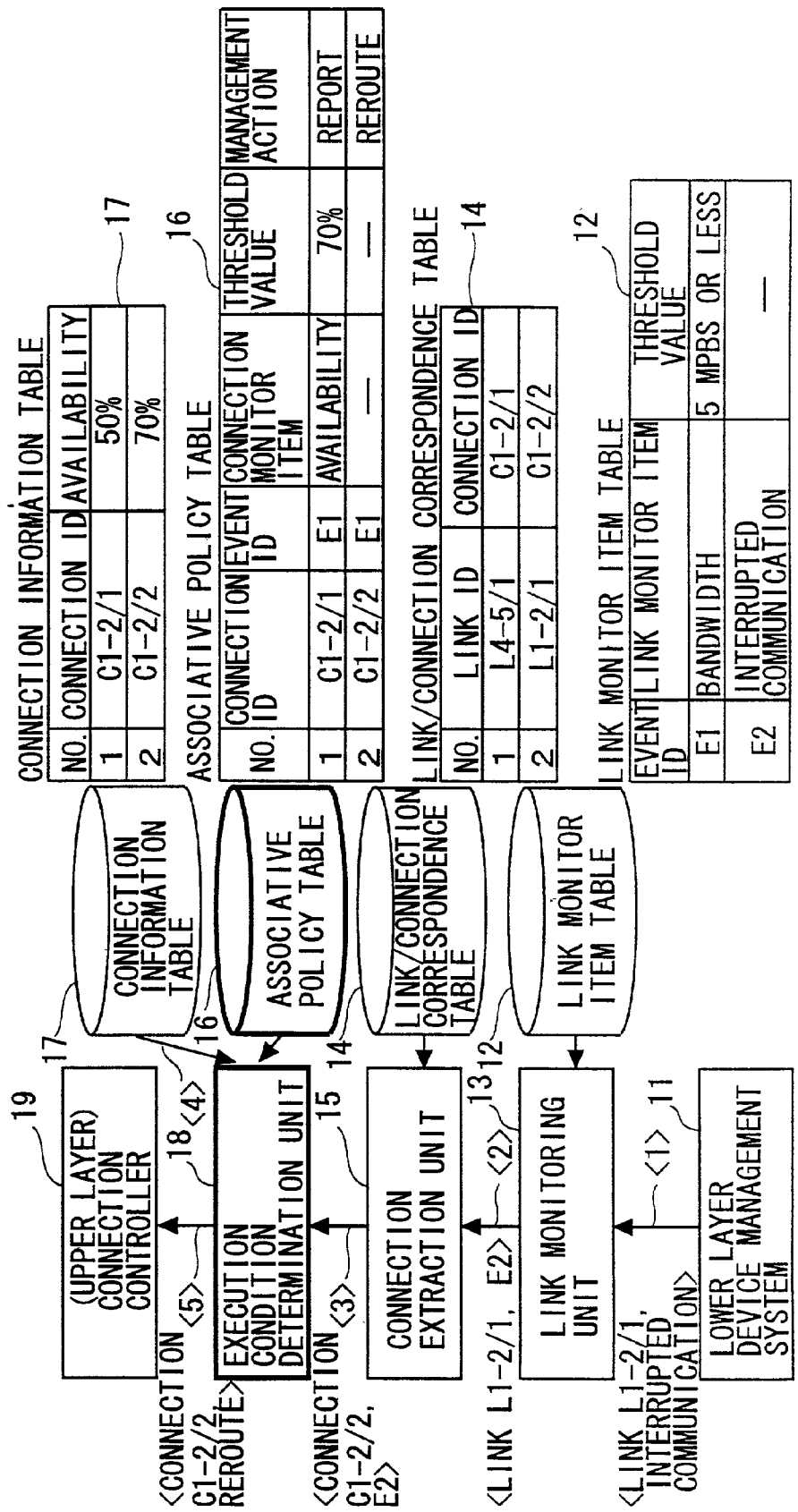
FIG. 11 is a diagram for explaining an exemplary operation of the management system according to the first embodiment.
Figure 12:
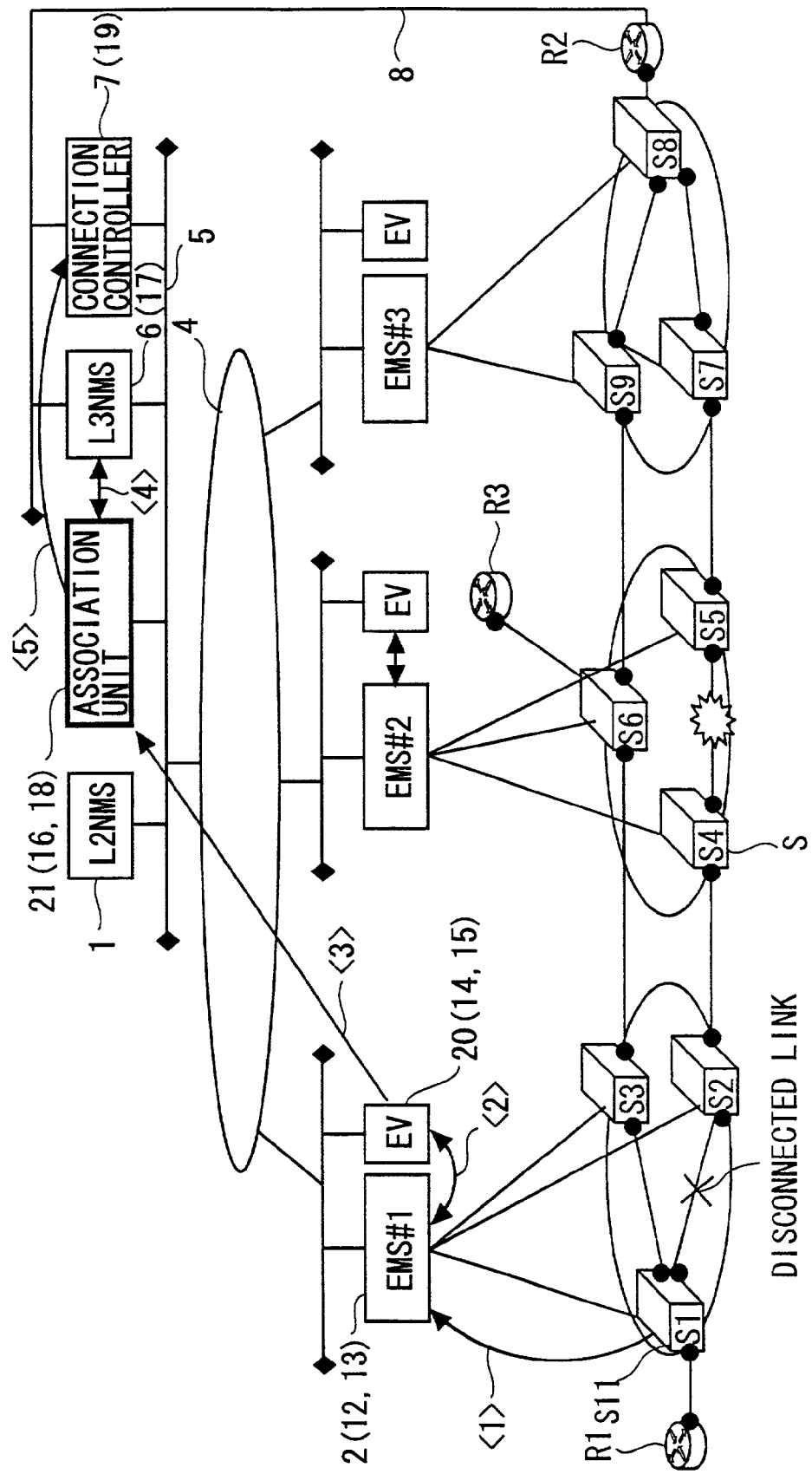
FIG. 12 is a diagram for explaining an exemplary operation of the management system according to the first embodiment.

FIGS. 11 and 12 are diagrams illustrating an exemplary control conducted by the management system 100 according to the first embodiment. In FIGS. 11 and 12, for example, upon detection of a disconnection (interrupted communication) of the link L1-2/1 which couples the transmitter S1 to the transmitter S2, the lower layer device management system 11 installed in the transmitter S1 notifies the link monitoring unit 13 installed in the EMS2 of the link status "interrupted communication" and the link ID "L1-2/1" (<1> in FIG. 12).

The link monitoring unit 13 searches the link monitor item table 12 with the link status "interrupted communication" used as a key to read an event ID "E2" corresponding to the link status "interrupted communication," and notifies the connection extraction unit 15 installed in the event reception/connection extraction unit 20 of the read event ID "E2" and the link ID "L1-2/1" (<2> in FIG. 12).

The connection extraction unit 15 reads a corresponding connection ID from the link/connection correspondence table 14 with the link ID "L1-2/1" used as a key, and notifies the execution condition determination unit 18 installed in the association unit 21 of the read connection ID "C1-2/2" and the event ID "E2" (<3> in FIG. 12).

The execution condition determination unit 18 reads corresponding management action information "reRoute" with the connection ID "C1-2/2" used as a key, and notifies the connection controller 7 (19) of the read management action informational "reRoute" and the connection ID"C1-2/2" (<5> in FIG. 12).

It should be noted that when the execution condition determination unit 18 acquires a connection monitor item and threshold value corresponding to a connection ID from the associative policy table 16, the execution condition determination unit 18 retrieves a connection monitor item (here, the availability) corresponding to the connection ID from the connection information table in the L3NMS6 (<4> in FIG. 12), and instructs the L3NMS6 or connection controller 7 to take the management action only when the availability satisfies a condition defined by the threshold value.

Upon receipt of the management action information and connection ID from the execution condition determination unit 18, the L3NMS6 and connection controller 7 controls the upper network UN based on this management action information. In this example, the connection controller 19 receives the management action information "reRoute" and connection ID "C1-2/2" from the execution condition determination unit 18. In this event, the connection controller 19 performs a rerouting control through manipulations on a routing table as follows.

Specifically, based on the information <C1-2/2, reRoute> notified from the execution condition determination unit 18, the connection controller 19 recognizes that a need exists for bypassing the second connection C1-2/2 which has been set between the transmitter (router) R1 and the transmitter (router) R2.

The connection controller 19 confirms, using network configuration information held in the L3NMS6, that the transmitter R1 and transmitter R2 could be connected through a route of transmitter R1—transmitter R3—transmitter R2.

In this event, when the routing of the upper network UN has been conducted by the OSPF, the connection controller 19 sets a line cost (metric) between the transmitter R1 and transmitter R2 higher than the metric of transmitter R1—transmitter R3—transmitter R2.

Since OSPF is a routing scheme which selects the route having the smallest metric between two arbitrary points, the traffic between the transmitter R1 and transmitter R2 ends up in passing the route: transmitter R1—transmitter R3—transmitter R2.

Even if the name of a function provided by the connection controller 19 or the routing scheme employed in the upper layer is different from the foregoing, the management action (the re-routing in this example) can be taken making use of existing techniques.

Also, in FIGS. 11 and 12, if the bandwidth of a link L4-5/1 is reduced to 5 Mbps or less, the link monitoring unit 13 detects this reduction in bandwidth, and notifies the connection extraction unit 15 of an event ID "E1" and a link ID "L4-5/1" (<2> in FIG. 12).

Responsively, the connection extraction unit 15 recognizes that the connection C1-2/1 is affected by the reduced bandwidth, and notifies the execution condition determination unit 18 of the event ID "E1" and connection ID "C1-2/1" (<3> in FIG. 12).

The execution condition determination unit 18 searches the associative policy table 16 with the event ID "E1" and connection ID "C1-2/1" used as keys to acquire information which describes that a management action "changeFWQ" is taken when the "availability" of an associated connection is 70% or lower, and retrieves the availability of the connection from the connection information table (<4> in FIG. 12).

As a result of the foregoing, when the availability of the connection is 70% or lower, the execution condition determination unit 18 notifies the connection controller 19 of the connection ID "C1-2/1" and management action information "changeFWQ," and the connection controller 19 takes the management action "changeFWQ." Conversely, if the availability does not satisfy the condition, the management action is not taken.

According to the first embodiment, if a fault or degraded performance (event) defined as an associative policy occurs on a link L, the link monitoring unit 13 detects this event. The connection extraction unit 15 extracts a connection which is affected by this event, and the execution condition determination unit 18 determines whether or not an execution condition is satisfied for a management action corresponding to the event and connection. Finally, the connection controller 19 takes the management action when the execution condition is satisfied.

Thus, according to the first embodiment, a fault can be immediately recovered in the upper layer by making use of the status of the lower layer for controlling the upper layer. Specifically, a fault on a link L can be detected earlier than a policy control based only on information on the upper layer (layer 3), thereby immediately performing the re-routing for this fault. Also, since a degraded performance on the link L is detected as an event to which a management action is taken, a proper management/control can be accomplished for the layered network, resulting in the advantage of preventing the service quality from being degraded, and the like.

[Second Embodiment]

Next, description will be made on a management system according to a second embodiment of the present invention. Since the second embodiment has common aspects to the first embodiment, the following description will be centered mainly on different aspects, with description on such common aspects being omitted. The management system in the second embodiment has similar components to those in the first embodiment (see FIG. 1). However, the second embodiment differs from the first embodiment in the data structure of the associative policy table and the processing in the execution condition determination unit.

FIGS. 13A and 13B are explanatory diagram showing examples of an associative policy table 16A in the second embodiment. Each of records stored in the associative policy table 16A includes a priority. The priority indicates the priority given to the execution of an associated policy control, wherein as the value indicative of the priority is smaller, control activity for a connection is given a higher priority.

Figure 14:
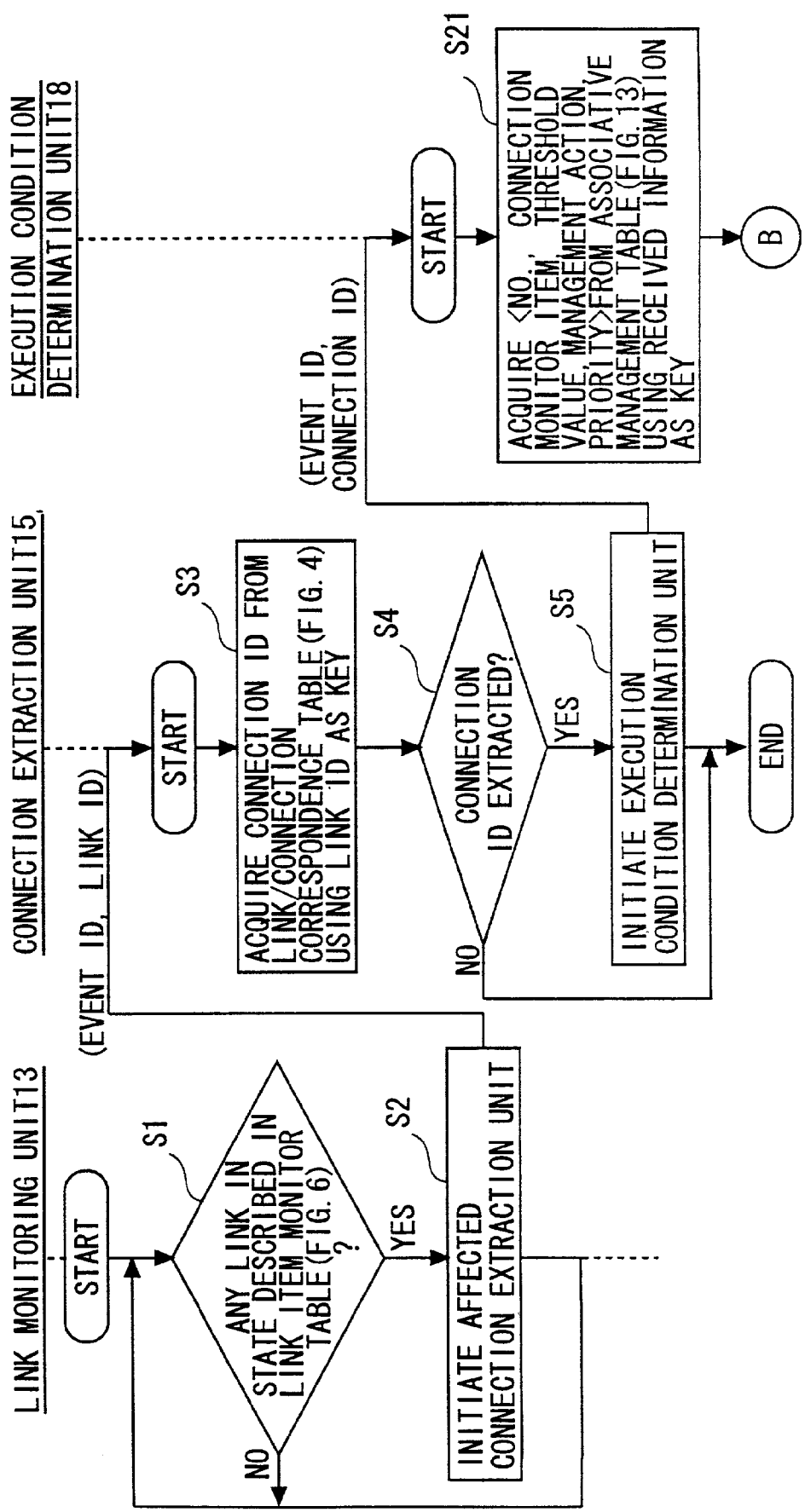
FIG. 14 is flow charts illustrating a routine processed by a management system according to the second embodiment.
Figure 15:
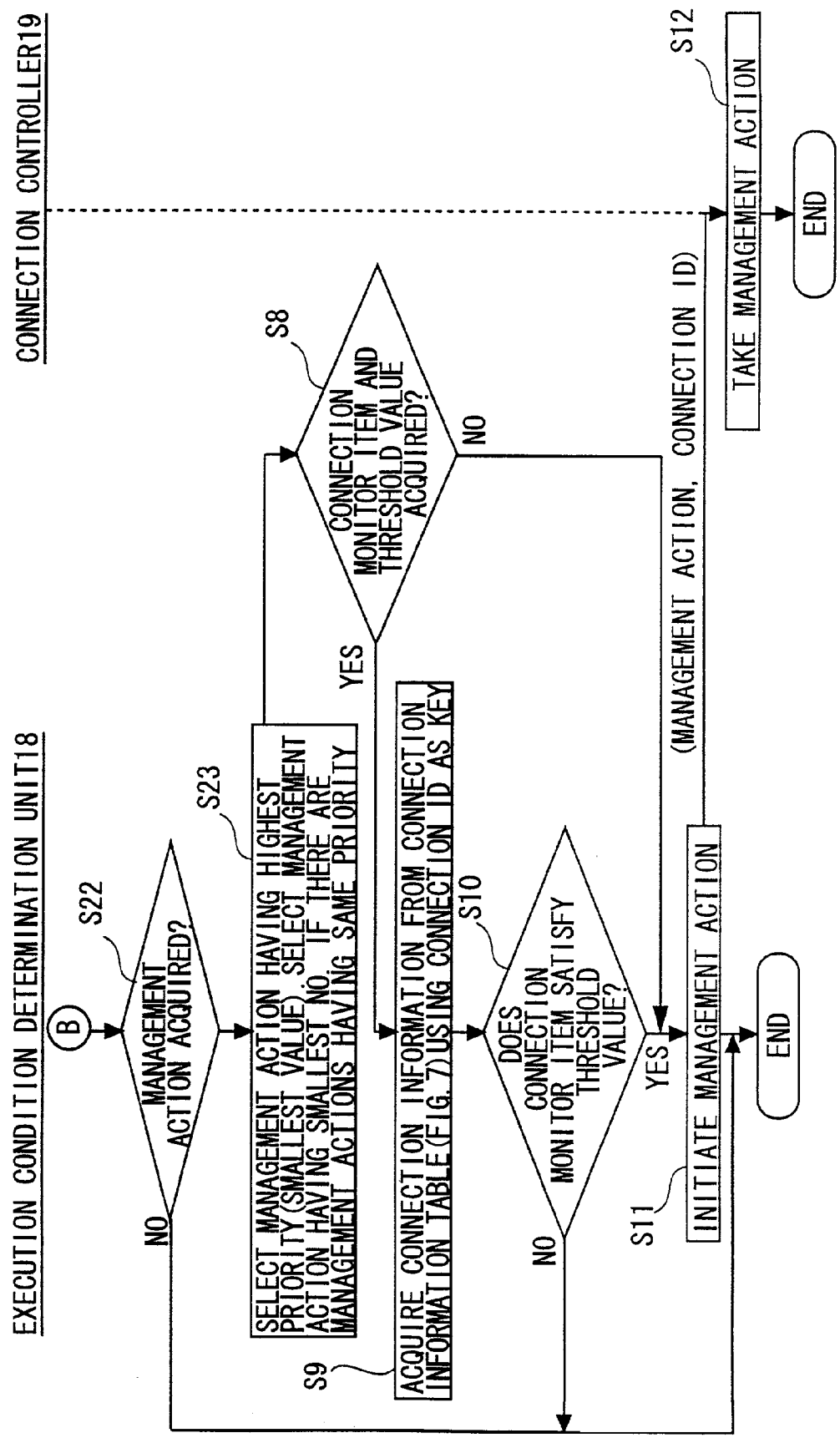
FIG. 15 is flow charts illustrating a routine processed by a management system according to the second embodiment.

FIGS. 14 and 15 are flow charts illustrating a routine processed by the management system in the second embodiment. As illustrated in FIG. 14, upon receipt of an event ID and a connection ID, the execution condition determination unit 18 acquires a management number, a connection monitor item, a threshold value, management action information, and a priority from a record corresponding to the received event ID and connection ID (step S21).

Next, the execution condition determination unit 18 determines whether or not the management action information can be acquired (step S22). In this event, the execution condition determination unit 18 terminates the processing if no management action information can be acquired (NO at step S22). In consequence, no policy control is conducted for the upper layer.

On the other hand, when the management action information can be acquired (YES at step S22), the execution condition determination unit 18 selects the one having the highest priority (the smallest value indicative of the priority) of acquired management actions (step S23).

When a single management action is acquired, the execution condition determination unit 18 selects this management action. On the other hand, when there are a plurality of management actions having the same highest priority, the execution condition determination unit 18 selects the management action which has the smallest management number. The subsequent processing is similar to that in the first embodiment, so that description thereon is omitted.

An exemplary control in the second embodiment will be explained with reference to FIG. 11. Assume herein that the associative policy table 16A holds the contents as shown in FIG. 13(B). For example, the execution condition determination unit 18 receives an event ID "E1" and a connection ID "C1-2/1", and an event ID "E2" and a connection ID "C1-2/2" from the connection extraction unit 15.

In this event, the execution condition determination unit 18 acquires <availability equal to or lower than 70%, change FWQ, priority 1> and <-, -, sendReport, priority 2> as information corresponding to the events E1 and E2 from the associative policy management table 16A (FIG. 13(B)).

Then, the execution condition determination unit 18 determines in accordance with the priority whether or not a management action should be taken. In this example, the execution condition determination unit 18 confirms the availability of the connection "C1-2/1" based on the priority 1 assigned to the event ID "E1." The connection controller 19 takes the management action "changeFWQ" when the availability of this connection "C1-2/1" is 70% or lower, and otherwise takes the management action "sendReport" having the priority 2.

While in the foregoing example, the connection controller 19 takes any of management actions which satisfy their execution conditions, the connection controller 19 may take a plurality of management actions which satisfy their execution conditions in a priority order.

Except for the foregoing implementation, the second embodiment is similar to the first embodiment. According to the second embodiment, it is possible to produce advantageous effects substantially similar to those of the first embodiment. In addition, according to the second embodiment, since the priority is set to the associative policy, policy controls (management actions) having higher priorities can be preferentially conducted for a plurality of connections subjected to the policy controls.

Third Embodiment

Next, description will be made on a network management system according to a third embodiment of the present invention. Since the third embodiment has common aspects to the first embodiment, the following description will be centered mainly on different aspects, with description on such common aspects being omitted.

Figure 16:
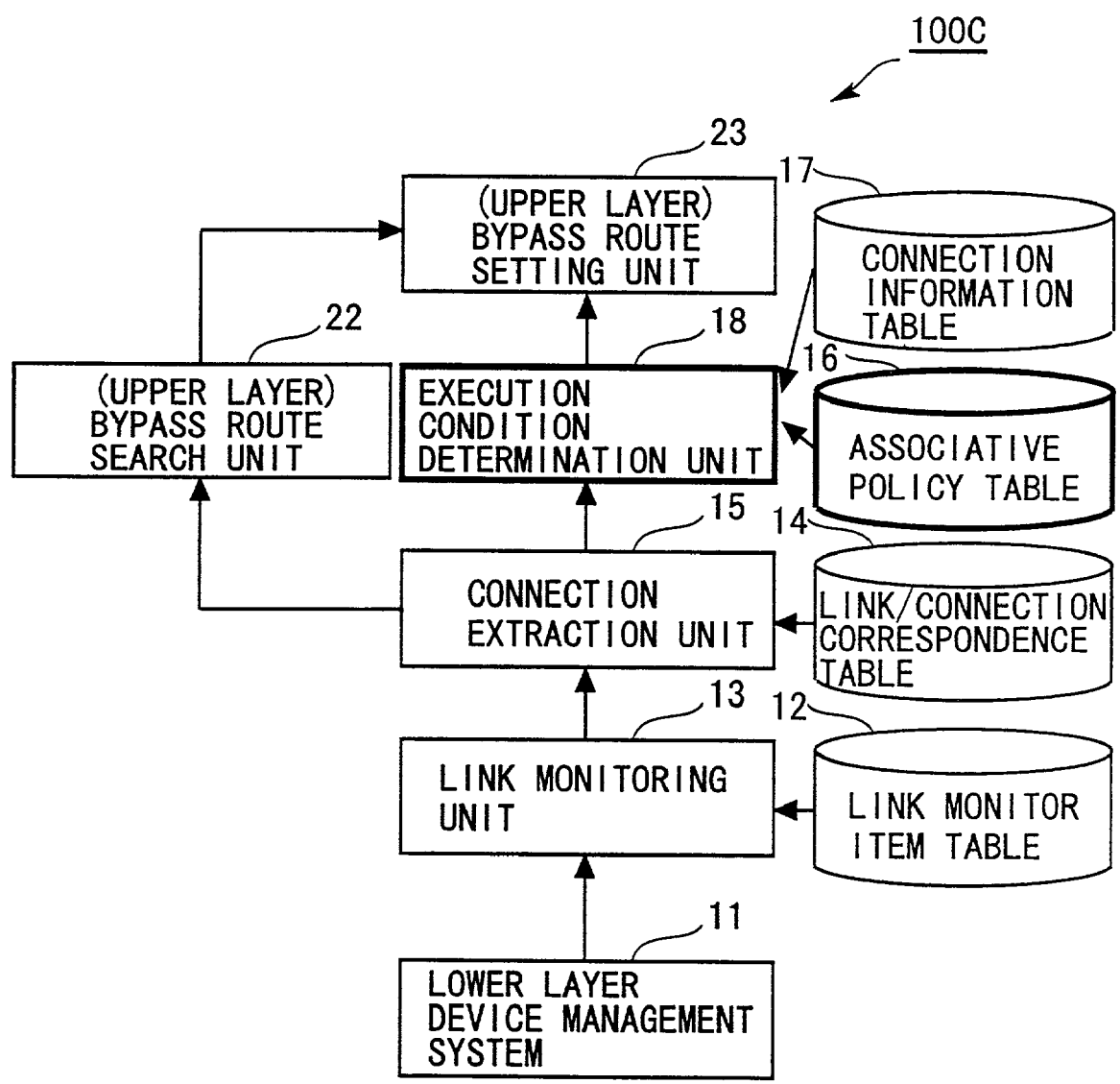
FIG. 16 is a diagram illustrating an exemplary configuration of a management system according to a third embodiment.

FIG. 16 is a diagram illustrating an exemplary configuration of the management system 100C according to the third embodiment. The management system 100C comprises a bypass route search unit 22, and a bypass route setting unit 23 in addition to the components in the first embodiment. The bypass route search unit 22 (calculating means) calculates and determines a bypass route for a connection of interest. The bypass route setting unit 23 (control means), which is one of functions included in the connection controller 19, is operative when the re-routing is performed for making a bypass setting for an alternative transmitter R such that the traffic bypasses through a bypass route which has been previously established by the bypass route search unit 22.

Figure 17:
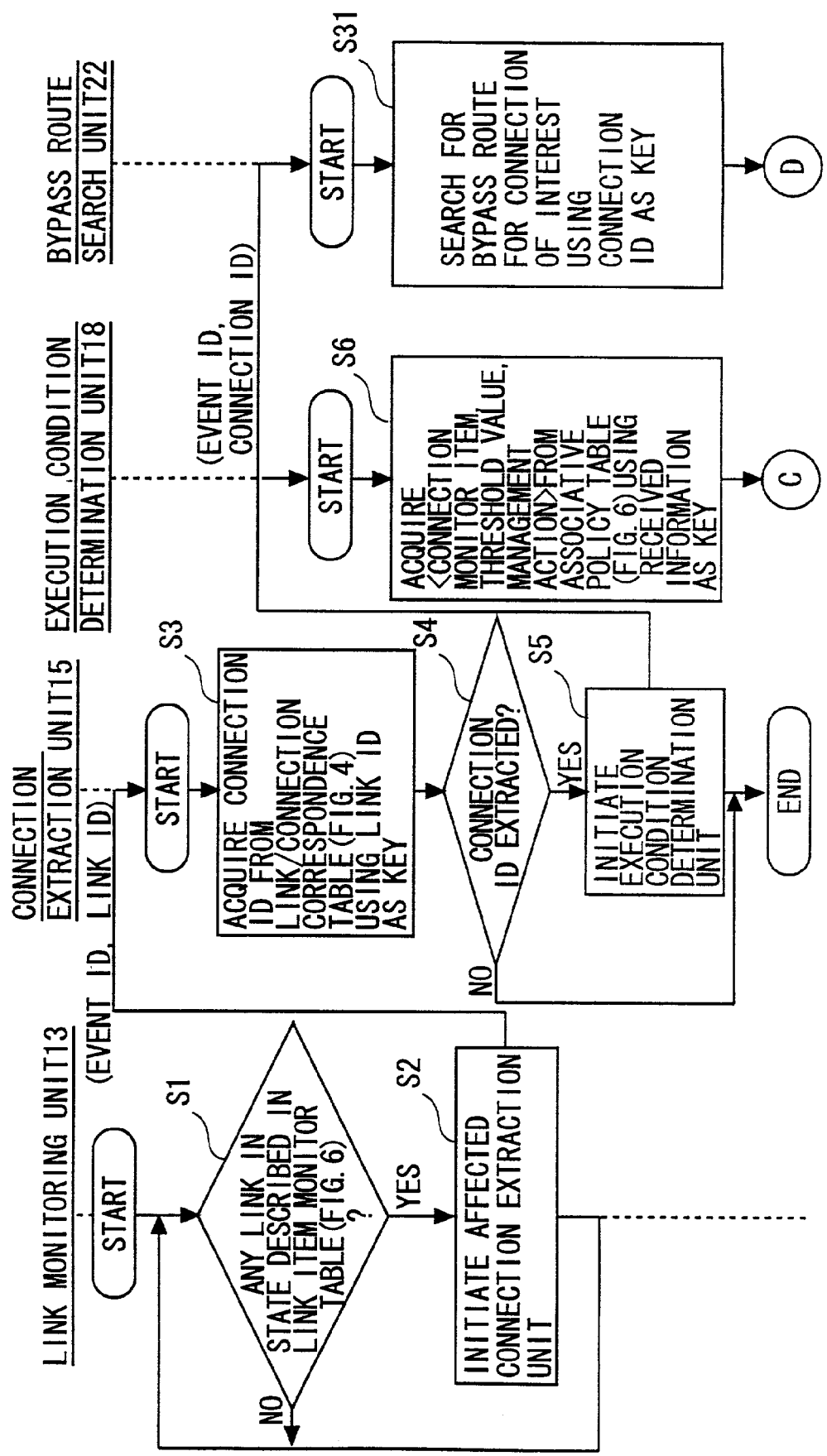
FIG. 17 is flow charts illustrating a routine processed by the management system according to the third embodiment.
Figure 18:
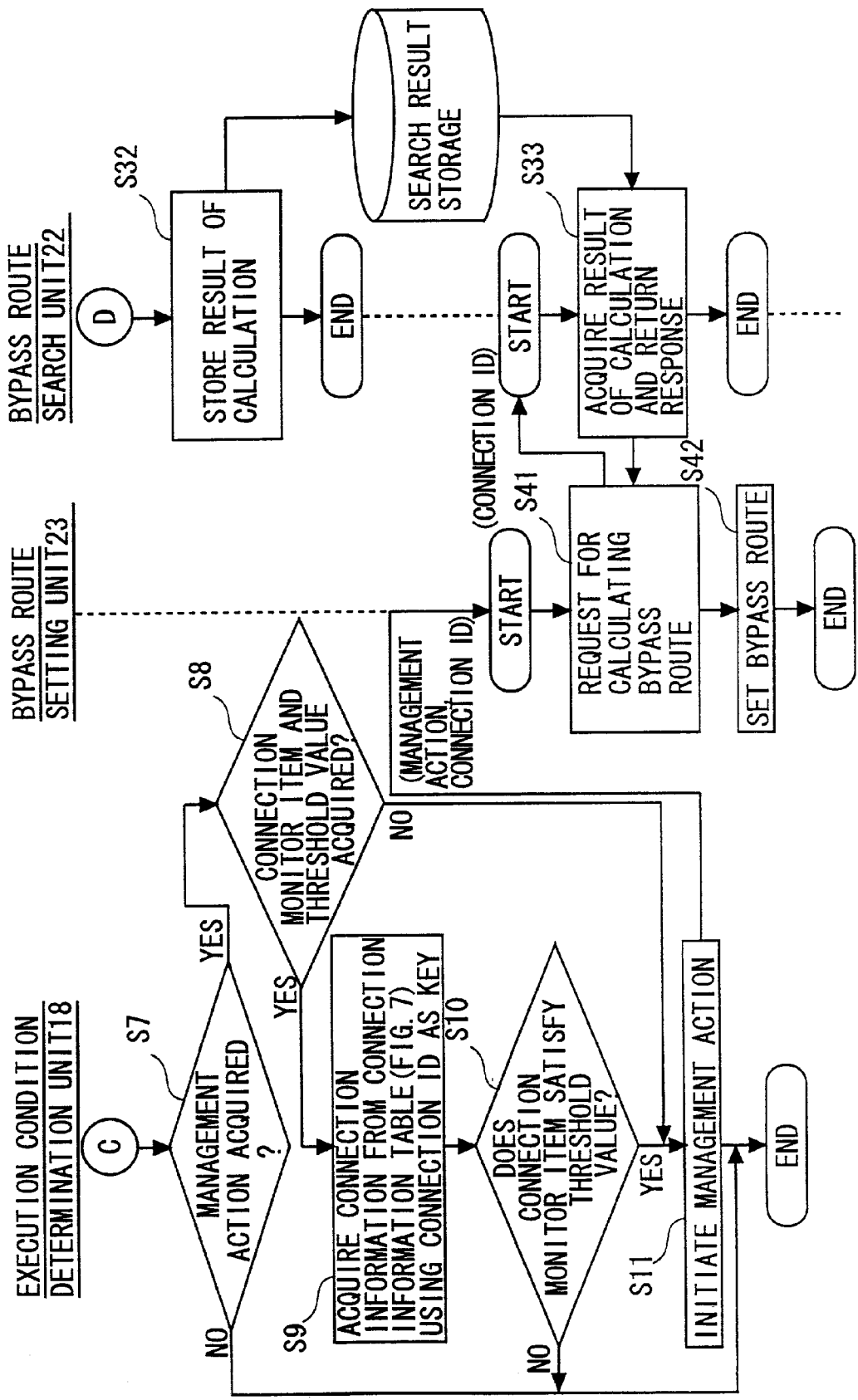
FIG. 18 is flow charts illustrating a routine processed by the management system according to the third embodiment.

FIGS. 17 and 18 are flow chart illustrating a routine processed by the management system 100C in the third embodiment. In FIG. 17, when the connection extraction unit 15 can extract a connection ID from the link/connection correspondence table 14 (YES at step S4), the connection extraction unit 15 notifies the execution condition determination unit 18 and bypass route search unit 22 of the connection ID and associated event ID to initiate these components (step S5A).

The bypass route search unit 22 calculates a bypass route for a connection in the upper layer corresponding to the connection ID (step S31). The bypass route search unit 22 previously holds information for calculating bypass routes. Upon terminating the calculation, the bypass route search unit 22 stores the result of this calculation (information on a bypass route) in a predetermined storage region as information on an established bypass route (step S32).

On the other hand, the execution condition determination unit 18 performs the processing similar to that in the first embodiment, and notifies the connection controller 19 of information on a management action which should be taken, and the connection ID. In this event, when the management action indicates "reRoute," the bypass route setting unit 23 is initiated. The bypass route setting unit 23 requests the bypass route search unit 22 to calculate a bypass route (step S41).

Upon receipt of the request for calculation from the bypass route setting unit 23, the bypass route search unit 22 reads the result of calculation (information on the bypass route) stored in the storage region, which is provided to the bypass route setting unit 23 (step S33) The bypass route setting unit 23 sets a bypass route using the information on the bypass route received from the bypass route search unit 23.

The foregoing bypass route search unit 22 and bypass route setting unit 23 are installed in the upper layer management system; the bypass route search unit 22 is installed, for example, in the L2NMS6 or connection controller 7; and the bypass route setting unit 23 is installed in the connection controller 7. In the third embodiment, the link/connection correspondence table 14 and connection extraction unit 15 may reside in either the event reception/connection extraction unit 20 or the association unit 21, though they are preferably installed in the association unit 21. Except for the foregoing implementation, the third embodiment is similar to the first embodiment.

According to the third embodiment, it is possible to produce advantageous effects substantially similar to those of the first embodiment. In addition, the bypass route search unit 22 receives a connection ID from the connection extraction unit 15, and previously calculates information on a bypass route for a corresponding connection. In this way, when the bypass route setting unit 23 executes "reRoute" as an associated management action, information on a bypass route can be immediately acquired from the bypass route search unit 22. This can reduce a time period required from the time the bypass route setting unit 23 receives a management action to the time a bypass route has been established (a time period required for establishing the bypass route). The configuration of the third embodiment may be combined with the configuration of the second embodiment (the configuration associated with the priority).

Fourth Embodiment

Next, description will be made on a management system according to a fourth embodiment of the present invention. Since the fourth embodiment has common aspects to the first embodiment, the following description will be centered mainly on different aspects, with description on such common aspects being omitted.

Figure 19:
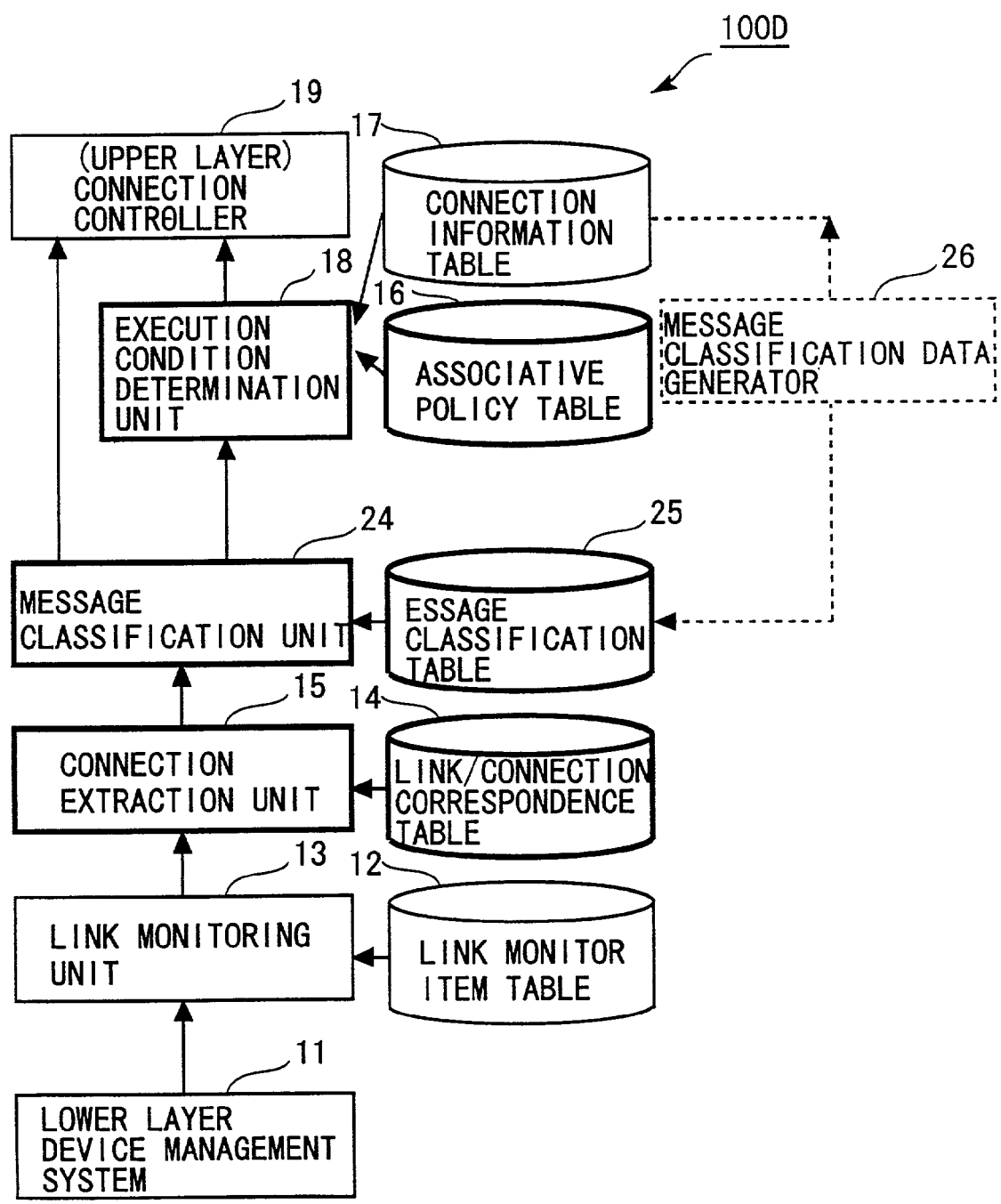
FIG. 19 is a diagram illustrating an exemplary configuration of a management system according to a fourth embodiment.

FIG. 19 is a diagram illustrating an exemplary configuration of the management system 100D in the fourth embodiment. The management system 100D differs from the first embodiment in that the management system 100D additionally includes a message classification unit 24 (second determining means) interposed between the connection extraction unit 15 and execution condition determination unit 18, a message classification table 25 referenced by the message classification unit 24, and a message classification data generator 26 for creating the message classification table 25 using the associative policy table 16.

FIG. 20 is an explanatory diagram showing an example of the message classification table 25. The message classification table 25 holds one or a plurality of records, each of which includes an event ID, a connection ID, and management action information.

Figure 21:
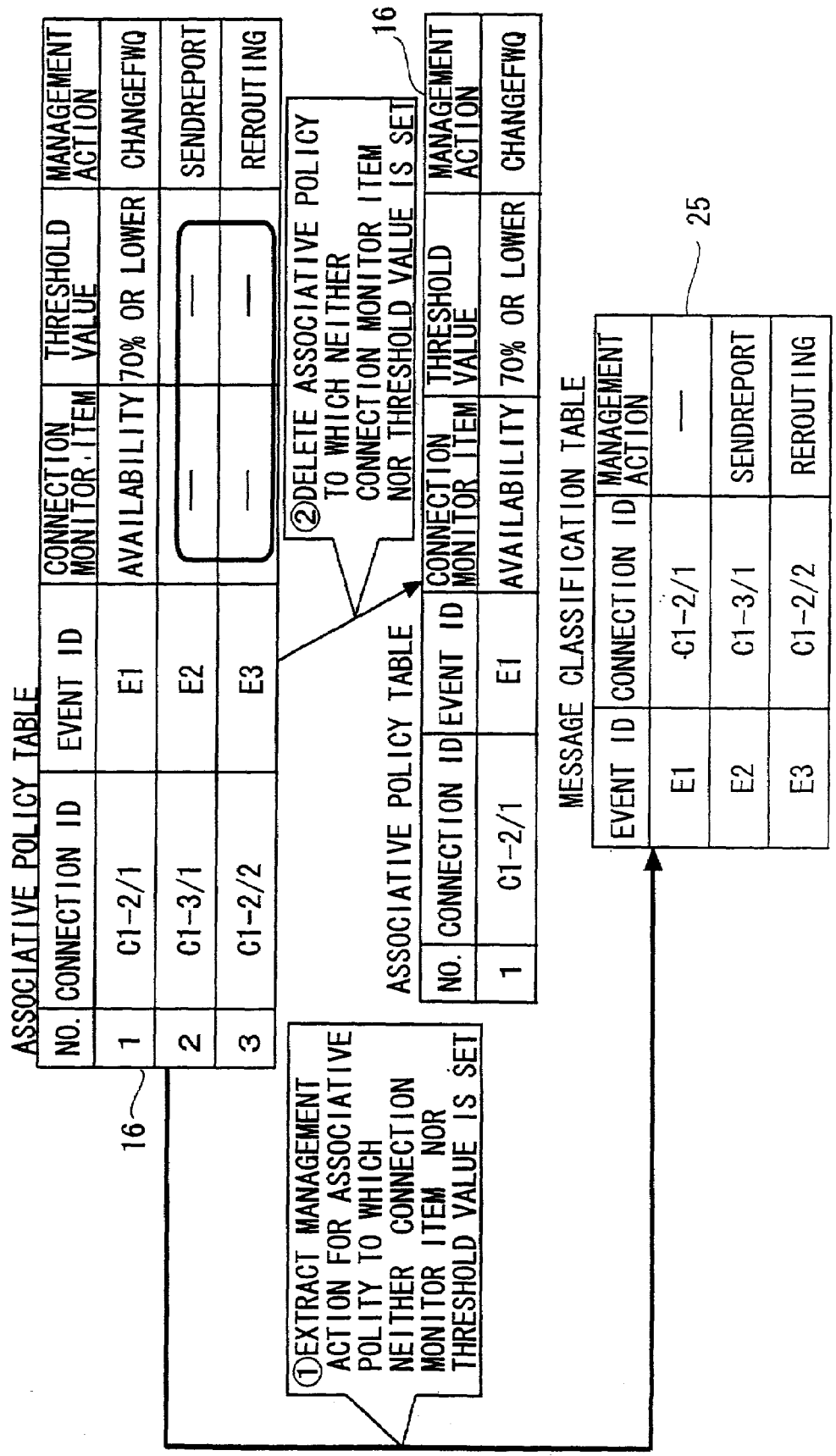
FIG. 21 is a diagram for explaining a method of generating the message classification table shown in FIG.

FIG. 21 is a diagram showing how the message classification data generator 26 generates the message classification table 25. When a link monitor item and a threshold value defined in the associative policy table 16 are re-written to an event ID, the message classification data generator 26 extracts one or a plurality of records, which have no connection monitor item or threshold value set therein, from the associative policy table 16. In this example, records having management numbers 1 and 2 are extracted.

Subsequently, the message classification data generator 26 generates the message classification table 25 using connection IDs, event IDs and management action information in the extracted records. On the other hand, the message classification data generator 26 deletes the extracted records (the records which have no connection monitor item or threshold value set therein (associative policy)) from the associative policy table 16.

Figure 22:
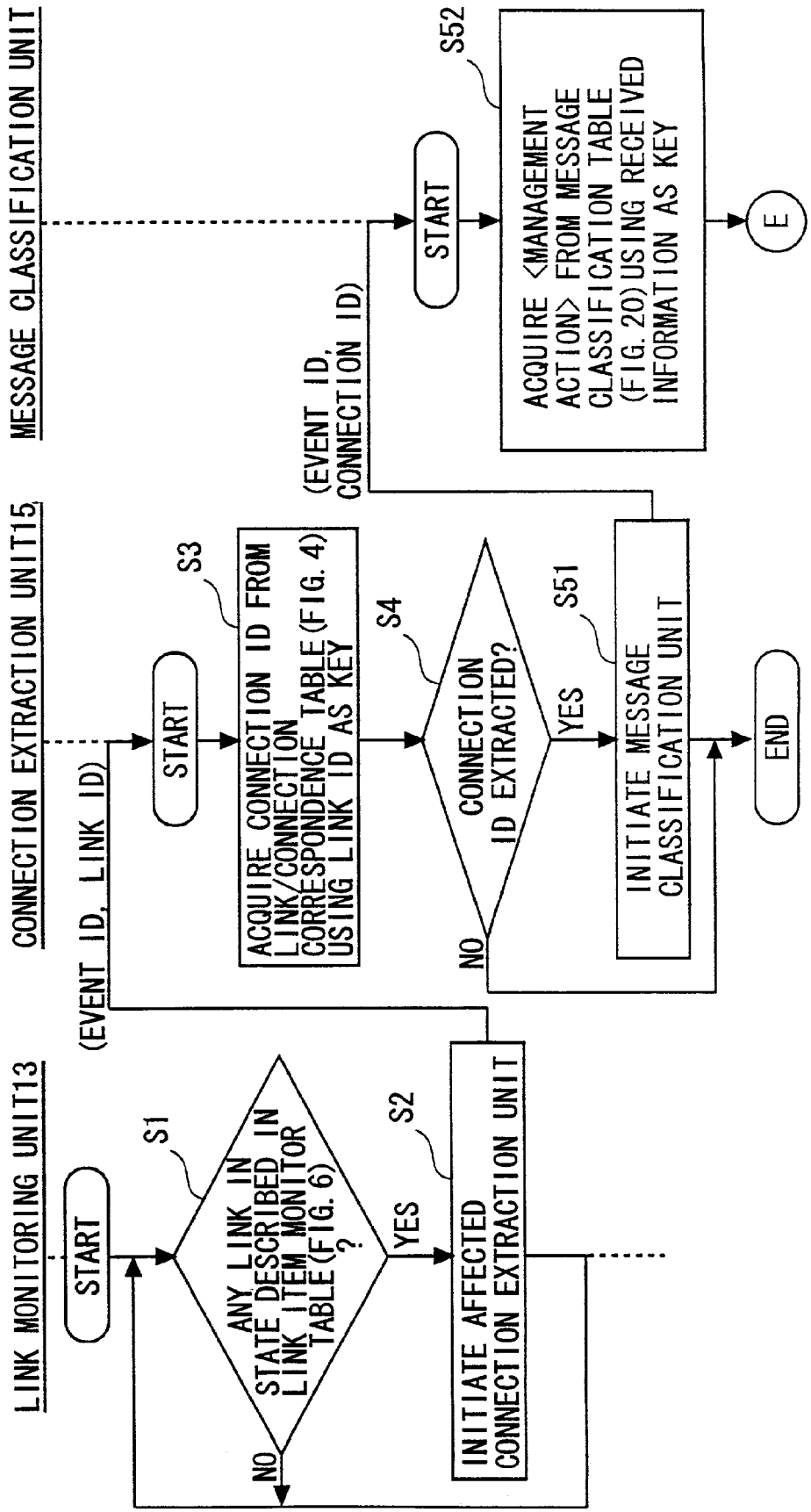
FIG. 22 is flow charts illustrating a routine processed by the management system according to the fourth embodiment of the present invention.
Figure 23:
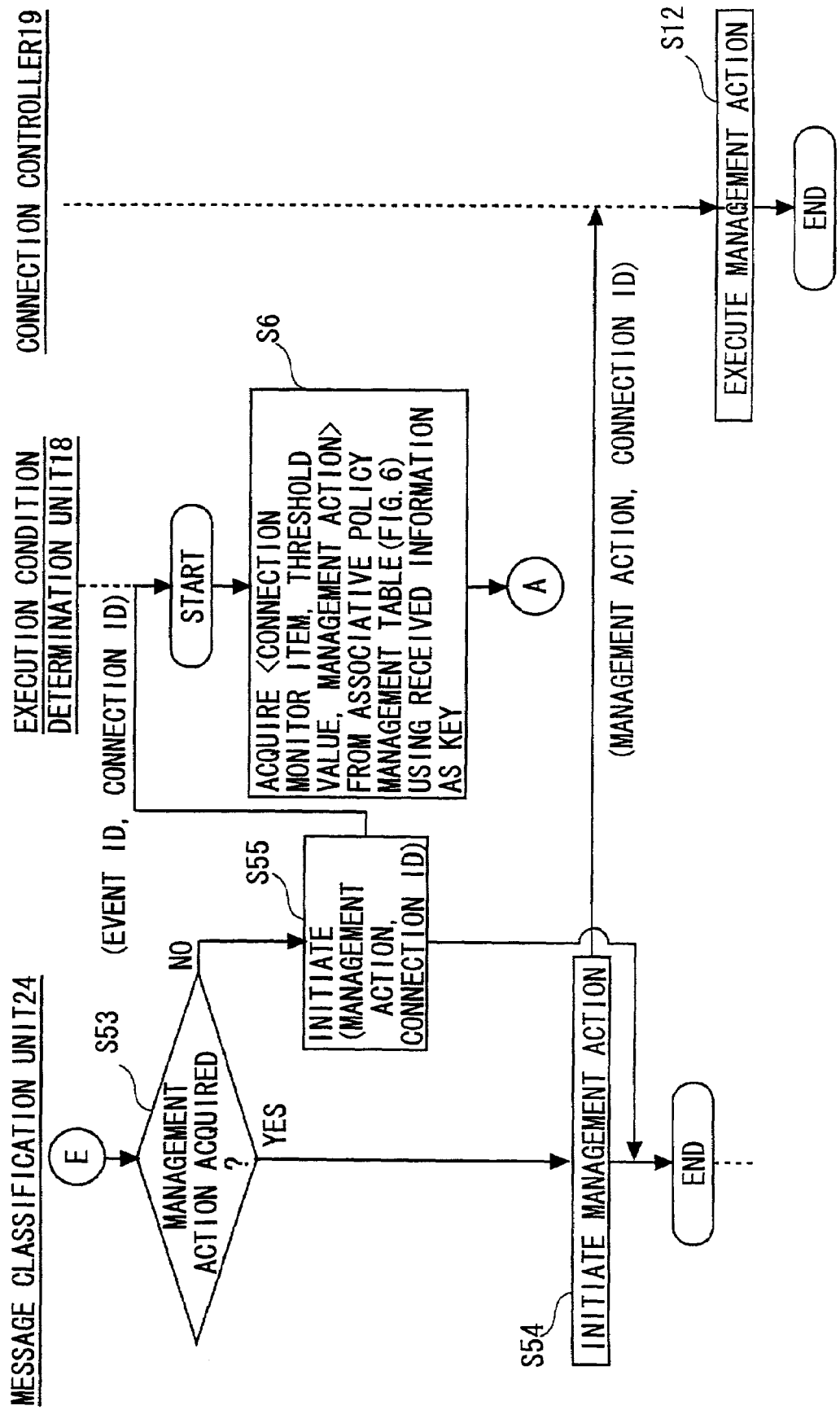
FIG. 23 is flow charts illustrating a routine processed by the management system according to the fourth embodiment of the present invention.

FIGS. 22 and 23 are flow charts illustrating a routine processed by the management system 100D according to the fourth embodiment. As illustrated in FIG. 22, when the connection extraction unit 15 can extract a connection ID from the link/connection correspondence table 14 (YES at step S4), the connection extraction unit 15 notifies the message classification unit 24, rather than the execution condition determination unit 18, of an event ID (information on link fault and degraded performance) and the connection ID to initiate the message classification unit 24 (step S51).

The message classification unit 24 has previously received a management policy, as the message classification table 25, which does not require the determination of a threshold value for connection data in the lower layer. The message classification unit 24 searches the message classification table 25 with the event ID and connection ID from the connection extraction unit 15 as keys to acquire corresponding management action information (step S52).

Subsequently, the message classification unit 24 determines whether or not management action information can be acquired (step S53). When acquired (YES at step S53), the message classification unit 24 notifies the connection controller 19 of the connection ID and management action information to initiate the management action (step S54). In this way, the connection controller 19 takes the management action for a connection C corresponding to the connection ID.

On the other hand, when no management action information can be acquired (NO at step S53), the message classification unit 24 notifies the execution condition determination unit 18 of the connection ID and event ID to initiate the execution condition determination unit 18 (step S55). Subsequent processing is similar to that in the first embodiment.

Figure 24:
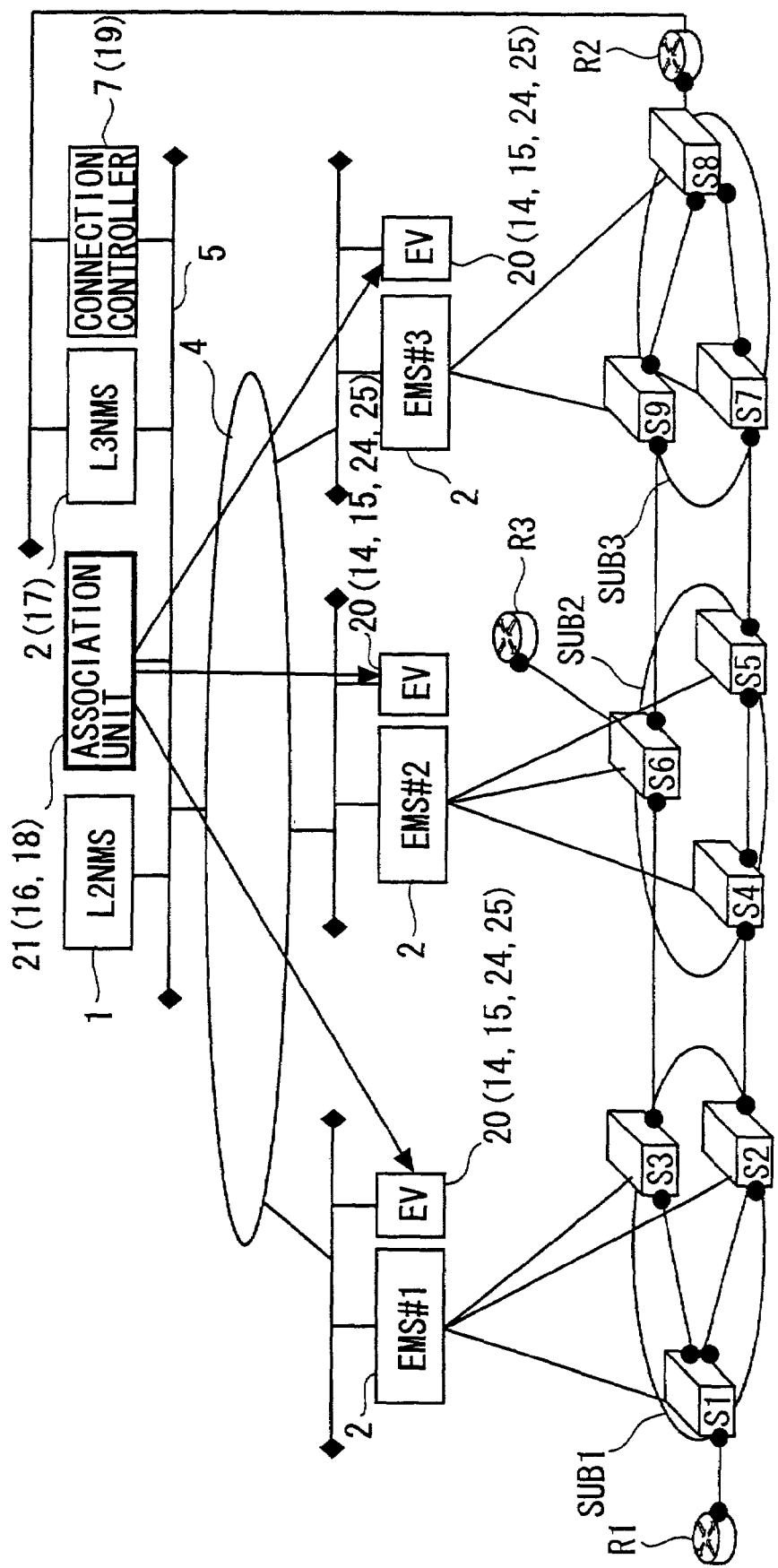
FIG. 24 is a diagram for explaining an exemplary operation of the management system according to the fourth embodiment.

FIG. 24 is a diagram illustrating an exemplary configuration in which the components shown in FIG. 19 are arranged in a layered network. In FIG. 24, the message classification unit 24 and message classification table 25 are installed in each event reception/connection extraction unit 20.

Though the message classification unit 24 and message classification table 25 may be installed in the association unit 21, they are preferably installed in each management domain (sub-network) for distributing the processing over associated management sub-domains (sub-networks) to relieve the processing burden on the association unit 21.

The association unit 21 receives link information and connection information from the L2NMS1 and L3NMS2 to generate data for generating the link/connection correspondence table 14. The association unit 21 also generates message classification data using the associative policy table 16. Then, the associative unit 21 distributes the generated data to each event reception/connection extraction unit 20.

Each event reception/connection extraction unit 20 generates the link/connection correspondence table 14 and associative policy table 16 using the generated data and holds the tables 14,16. In this way, the associative unit 21 functions as the message classification data generator 26, so that the link/connection correspondence table 14 and associative policy table 16 are dynamically generated between the associative unit 21 and even reception/connection extraction unit 20. Alternatively, the link/connection correspondence table 14 and associative policy table 16 may be statically generated by the administrator.

Figure 25:
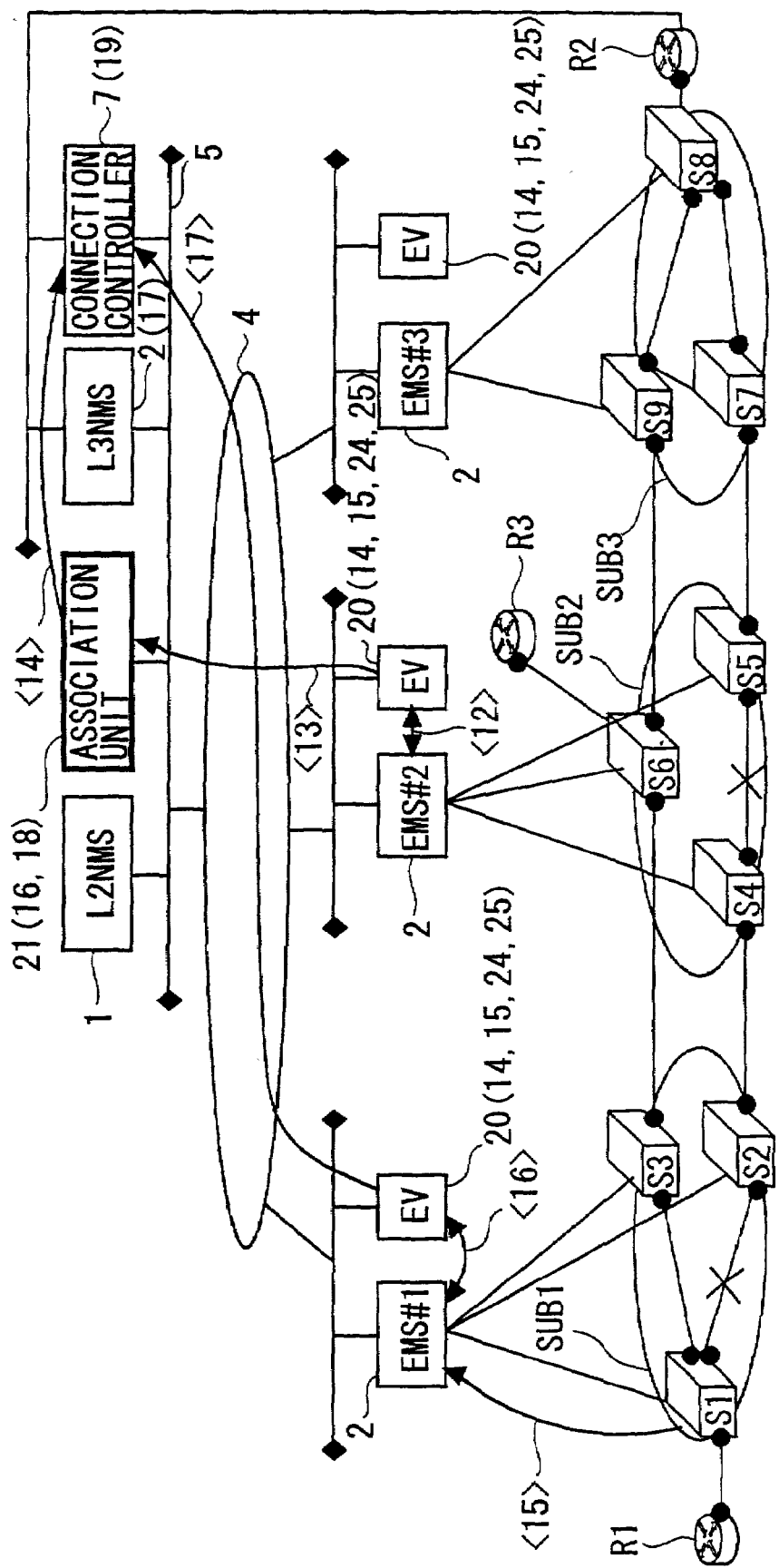
FIG. 25 is a diagram for explaining an exemplary operation of the management system according to the fourth embodiment.

FIG. 25 is a diagram illustrating an exemplary operation in the fourth embodiment. In FIG. 25, when the link monitoring unit 13 installed in the EMS2 determines based on a notice (<11> in FIG. 25) from the lower layer device management system 11 installed in the transmitter S4 that a link "L4-5/1" fails, the link monitoring unit 13 notifies the connection extraction unit 15 installed in the event reception/connection extraction unit 20 of an event ID "E1" and the link ID "L4-5/1" (<12> in FIG. 25).

In the event reception/connection extraction unit 20, the connection extraction unit 15 acquires a connection ID "C1-2/1" (see FIG. 4) corresponding to the link ID "L4-5/1" and provides the message classification unit 24 with the event ID "E1" and connection ID "C1-2/1" as data on an affected connection.

Upon receipt of the connection ID "C1-2/1" and event ID "E1" from the connection extraction unit 15, the message classification unit 24 searches the message classification table 25 previously set by the administrator to examine the presence or absence of management actions. In this event, since no management action is defined, the message classification unit 25 notifies the execution condition determination unit 18 of the event ID "E1" and connection ID "C1-2/1" (<13> in FIG. 25).

Subsequently, the execution condition determination unit 18 notifies the connection controller 19 of the connection ID "C1-2/1" and a management action "changeFWQ" (<14> in FIG. 25), so that the connection controller 19 executes "changeFWQ."

On the other hand, when the link monitoring unit 13 determines based on a notice (<15> in FIG. 25) from the lower layer device management system 11 installed in the transmitter S1 that the link "L1-2/1" fails, the link monitoring unit 13 notifies the connection extraction unit 15 installed in the event reception/connection extraction unit 20 of an event ID "E3" and the link ID "L1-2/1" (<16> in FIG. 25).

In the event reception/connection extraction unit 20, the connection extraction unit 15 acquire a connection ID "C1-2/2" (see FIG. 4) corresponding to the link ID "L1-2/1" and provides the message classification unit 24 with the event ID "E3" and connection ID "C1-2/2" as affecting connection data.

The message classification unit 24, when receives the connection ID "C1-2/2" and event ID "E3" from the connection extraction unit 15, searches the message classification table 25 to examine the presence or absence of management actions.

In this event, since a management action "reRoute" is defined, the message classification unit 24 notifies the connection controller 19 of the management action "reRoute" and connection ID "C1-2/2" without passing through the execution condition determination unit 18 (<17> in FIG. 25). The connection controller 19 executes "reRoute."

According to the fourth embodiment, it is possible to produce advantageous effects substantially similar to those of the first embodiment. In addition, execution conditions for management actions stored in the associative policy table 16 are classified into a first execution condition (comparison type condition) which requires a determination of a comparison value (threshold value) and a second execution condition (event type condition) which requires no determination of a comparison value. The second execution condition is stored in the message classification table 25.

Upon receipt of an event ID, the message classification unit 24 determines whether this event has a comparison type condition or an event type condition by referencing the message classification table 25. When the event has an event type condition, the message classification unit 24 notifies the connection controller 19 of management action information acquired from the message action table 25 without passing through the execution condition determination unit 18, causing the connection controller 19 to take the management action.

In this way, the processing otherwise performed by the execution condition determination unit 18 is omitted when the execution condition belongs to the event type condition. This allows an appropriate policy control (management action) to be immediately conducted for the upper layer based on a link fault in the lower layer.

Also, the connection extraction unit 15 and message classification unit 25 are installed in each of sub-networks in the lower layer, and the message classification unit 24 initiates the connection controller 19 for an associative policy (associative policy of event type condition) which does not require a determination of a connection monitor item by a threshold value. In this way, it is possible to (1) speed up the determination of associative policy resulting from the circumvention of the execution condition determination unit 18; and (2) reduce a time required in the execution condition determination unit 18 for a search due to a reduction in the number of records stored in the associative policy table 16.

Fifth Embodiment

Next, description will be made on a management system according to a fifth embodiment of the present invention. Since the fifth embodiment has common aspects to the fourth embodiment, the following description will be centered mainly on different aspects, with description on such common aspects being omitted.

FIG. 25 is an explanatory diagram showing an example of a message classification table 25A in the fifth embodiment.

In the fifth embodiment, each record stored in the message classification table 25A includes a priority (which is higher as the value is smaller) assigned by the administrator. Each record is also assigned a management number.

FIGS. 27 and 28 are flow charts illustrating a routine processed by the management system in the fifth embodiment. As illustrated in FIG. 27, upon receipt of an event ID and a connection ID from the connection extraction unit 15, the message classification unit 24 searches the message classification table 25A with these IDs used as keys to acquire a management number, a management action, and a priority (step S61).

Next, the message classification unit 24 determines whether or not management actions can be acquired (step S62 in FIG. 28). In this event, when the message classification unit 24 cannot acquire a management action (NO at step S62), the processing similar to the fourth embodiment is performed.

On the other hand, when management actions can be acquired (YES at step S62), the message classification unit 24 selects one having the highest priority of the acquired management actions (step S63).

When a single management action is acquired, the message classification unit 24 selects this management action. On the other hand, where there are a plurality of management actions having the same highest priority, the message classification unit 24 selects the management action which has the smallest management number. The subsequent processing is similar to that in the fourth embodiment, so that description thereon is omitted.

According to the fifth embodiment, when the link monitoring unit 13 notifies the connection extraction unit 15, for example, of an event ID "E1," event ID "E2," and link ID "L4-5/1," the message classification unit 24 acquires management actions and priorities corresponding to the event IDs "E1" and "E2" from the message classification table 25A (FIG. 26) which has the priorities previously added thereto.

For the extracted information, (1) if no management action is defined, or (2) if an event ID without a management action defined therefor has a higher priority, the message classification unit 24 notifies the execution condition determination unit 18 of the event ID and connection ID, followed by termination of the processing. Otherwise, the message classification unit 24 notifies the connection controller 19 of the management action information having the highest priority.

Except for the foregoing implementation, the fifth embodiment is similar to the fourth embodiment. According to the fifth embodiment, it is possible to produce advantageous effects substantially similar to those of the fourth embodiment. In addition, according to the fifth embodiment, since the priorities are set to event type management actions, those having higher priorities can be preferentially executed when there are a plurality of connections for which event type management actions should be taken. Further, in the fifth embodiment, the message classification unit 24 may notify the connection controller 19 of event type management actions in the priority order.

The configurations of the first through fifth embodiments described above may be combined as appropriate without departing from the object of the present invention.

What is claimed is:

1. A system for managing a layered network comprising:
   detecting means for detecting a fault or degraded performance of a lower layer line as an event, said lower layer line being a connection line in a lower layer;
   layer line determining means for determining an upper layer line which is affected by the detected event, the upper layer line being a connection line in an upper layer above the lower layer;

control means for conducting a control on said upper layer line;

control activity storing means for storing control activities for an upper layer line and execution conditions for the control activities in association with contents of events and the upper layer line; and determining means operative when an event is detected and an upper layer line is extracted for referencing said control content storing means to determine whether or not an execution condition for a control activity corresponding to contents of the detected event and the extracted upper layer line is satisfied and for instructing said control means to execute the control activity when said determining means determines the execution condition is satisfied.

2. A control system for a layered network according to claim 1, wherein:

said control activity storing means further stores priorities assigned for the respective control activities, and said determining means instructs said control means to execute a control activity in accordance with the priority when execution conditions for a plurality of control activities are satisfied for the contents of said detected event and said upper layer line.

3. A control system for a layered network according to claim 1, wherein said control activities are rerouting of an upper layer line, said control system further comprising:

calculating means operative when an upper layer line is determined for calculating a bypass route for said upper layer line, wherein said control means performs the rerouting using a bypass route previously calculated by said calculating means when said determining means determines that a execution condition for the rerouting is satisfied for said upper layer line.

4. A control system for a layered network according to claim 1, further comprising:

second determining means operative when an event is detected and an upper layer line is determined for determining whether or not a determination is necessary for said upper layer line by said determining means, and for instructing said control means to execute a control activity corresponding to the contents of the event and said upper layer line stored in said control activity storing means without passing through the detennination made by said determining means when determining that the determination of said determining means is not necessary, and for instructing said determining means to make the determination when determining that the determination of said determining means is necessary.

5. A control system for a layered network according to claim 4, wherein:

said lower layer network comprises a plurality of sub-network; and said second determining means is provided for each said sub-network, said second determining means configured to operate in parallel for said control means.

6. A control system for a layered network according to claim 4, wherein:

said second determining means performs processing in accordance with priorities assigned to the respective control activities when a plurality of control activities corresponding to the contents of said event and said upper layer line are stored in said control activity storing means.

7. A method of managing a layer network including an upper layer and a lower layer, comprising the steps of:

detecting, as an event, a fault or degraded performance of a lower layer line which is a connection line in a lower layer;

determining an upper layer line which is a connection line in an upper layer affected by the event;

conducting a control for the upper layer line;

storing control activities for an upper layer line, and execution conditions for the control activities in relation to contents of an event and the upper layer line;

determining, when an event is detected and an upper layer line is extracted, whether or not an execution condition is satisfied for a control activity corresponding to contents of the detected event and the determined upper layer line; and executing the control activity when determining that the execution condition is satisfied.

8. A method of managing a layered network according to claim 7, further comprising the steps of:

further storing priorities assigned to the respective control activities; and performing the control activities in accordance with the priorities when execution conditions for a plurality of control activities are satisfied for the contents of the event and the upper layer line.

9. A method of managing a layered network according to claim 7, wherein said control activities include rerouting of an upper layer line, said method further comprising the steps of:

calculating, when an upper layer line is determined, for calculating a bypass route for the upper layer line; and performing the rerouting using a previously calculated bypass route when determining that an execution condition for the rerouting is satisfied for the upper layer line.

10. A method of managing a layered network according to claim 7, further comprising the step of:

determining when an event is detected and an upper layer line is determined, whether or not said determination is necessary for the upper layer line;

when determining that said determination is not necessary, executing a control activity corresponding to the contents of the event and the upper layer line without passing through said determination; and when determining that said determination is necessary, executing said determination.

11. A method of managing a layered network according to claim 10, further comprising the step of:

when there are a plurality of control activities corresponding to the contents of the event and the upper layer line, executing the control activities in accordance with priorities assigned to the respective control activities.

* * * * *

UNITED STATES PATENT AND TRADEMARK OFFICE
CERTIFICATE OF CORRECTION

PATENT NO. : 7,082,099 B2 Page 1 of 1
APPLICATION NO. : 10/061058
DATED : July 25, 2006
INVENTOR(S) : Hitoshi Ueno et al.

It is certified that error appears in the above-identified patent and that said Letters Patent is hereby corrected as shown below:

Column 19, line 48: "-the detennination made-" should be changed to --the determination made--.

Signed and Sealed this

Twenty-third Day of January, 2007

JON W. DUDAS
*Director of the United States Patent and Trademark Office*